(12) United States Patent
Brakes

(10) Patent No.: US 11,192,629 B2
(45) Date of Patent: Dec. 7, 2021

(54) ROTATIONAL JOINT FOR AN AIRCRAFT FOLDING WING

(71) Applicant: AIRBUS OPERATIONS LIMITED, Bristol (GB)

(72) Inventor: David Brakes, Bristol (GB)

(73) Assignee: Airbus Operations Limited, Bristol (GB)

( * ) Notice: Subject to any disclaimer, the term of this patent is extended or adjusted under 35 U.S.C. 154(b) by 814 days.

(21) Appl. No.: 15/884,994

(22) Filed: Jan. 31, 2018

(65) Prior Publication Data

US 2018/0222569 A1 Aug. 9, 2018

(30) Foreign Application Priority Data

Feb. 3, 2017 (GB) ..................................... 1701850

(51) Int. Cl.
*B64C 3/56* (2006.01)

(52) U.S. Cl.
CPC ................. *B64C 3/56* (2013.01); *Y02T 50/10* (2013.01)

(58) Field of Classification Search
CPC .... B64C 3/56; B64C 1/30; B64C 3/00; B64D 47/00
See application file for complete search history.

(56) References Cited

U.S. PATENT DOCUMENTS

| 10,577,077 | B2 * | 3/2020 | Bishop | B64C 3/56 |
| 10,633,076 | B2 * | 4/2020 | Bishop | B64C 3/56 |
| 2010/0264260 | A1 * | 10/2010 | Hammerquist | B64C 3/56 244/49 |
| 2013/0341467 | A1 * | 12/2013 | Sakurai | B64C 3/56 244/201 |

(Continued)

FOREIGN PATENT DOCUMENTS

| CN | 204339264 | 5/2015 |
| EP | 2 676 878 | 12/2013 |

(Continued)

OTHER PUBLICATIONS

Combined Search and Examination Report for GB1701850.8, dated Jul. 20, 2017, 5 pages.

(Continued)

*Primary Examiner* — Brian M O'Hara
*Assistant Examiner* — Keith L Dixon
(74) *Attorney, Agent, or Firm* — Nixon & Vanderhye P.C.

(57) ABSTRACT

An aircraft (2) including a wing (1), the wing (1) having a fixed wing (3) and a wing tip device (4) at the tip of the fixed wing (3), the wing tip device (4) being rotatable relative to the fixed wing (3) between flight and ground configurations, the aircraft including a rotational joint (10) with a rotation mechanism (11) that rotatably couples the wing tip device (4) to the fixed wing (3) and a locking mechanism including a locking bore (53, 54) and a locking pin (51) that is receivable in the locking bore to lock the wing tip device (4)

(Continued)

in one of the flight or ground configurations, wherein the rotational joint includes an alignment mechanism including an alignment pin (61) and an alignment bore (62, 63) and at least one of the alignment pin and alignment bore is tapered such that engagement of the alignment pin (61) in the alignment bore acts to guide the locking bore and locking pin into alignment.

20 Claims, 24 Drawing Sheets

(56) References Cited

U.S. PATENT DOCUMENTS

| | | | | |
|---|---|---|---|---|
| 2017/0355442 | A1* | 12/2017 | Winkelmann | F16H 48/20 |
| 2018/0170519 | A1* | 6/2018 | Brakes | F16F 7/08 |
| 2018/0194453 | A1* | 7/2018 | Randall | B64C 23/072 |

FOREIGN PATENT DOCUMENTS

| | | |
|---|---|---|
| EP | 2 857 309 | 4/2015 |
| EP | 3 059 161 | 8/2016 |
| EP | 3 069 988 | 9/2016 |
| EP | 3 254 957 | 12/2017 |

OTHER PUBLICATIONS

European Search Report cited in EP 18152845.6, dated Jun. 11, 2018, eight pages.

\* cited by examiner

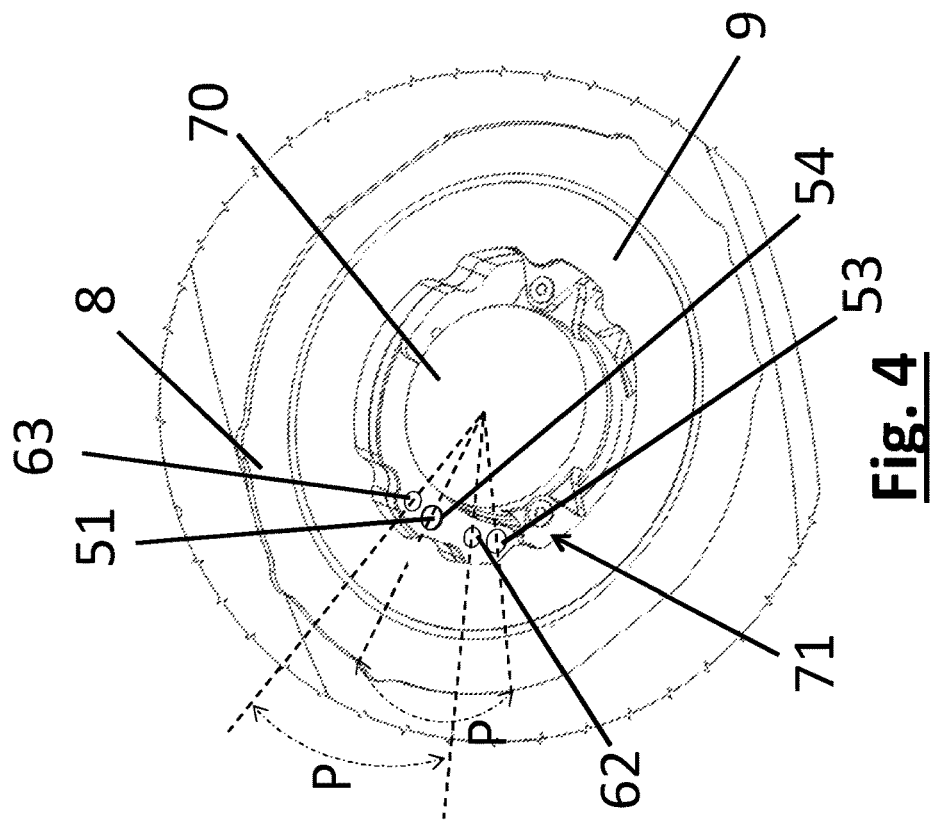
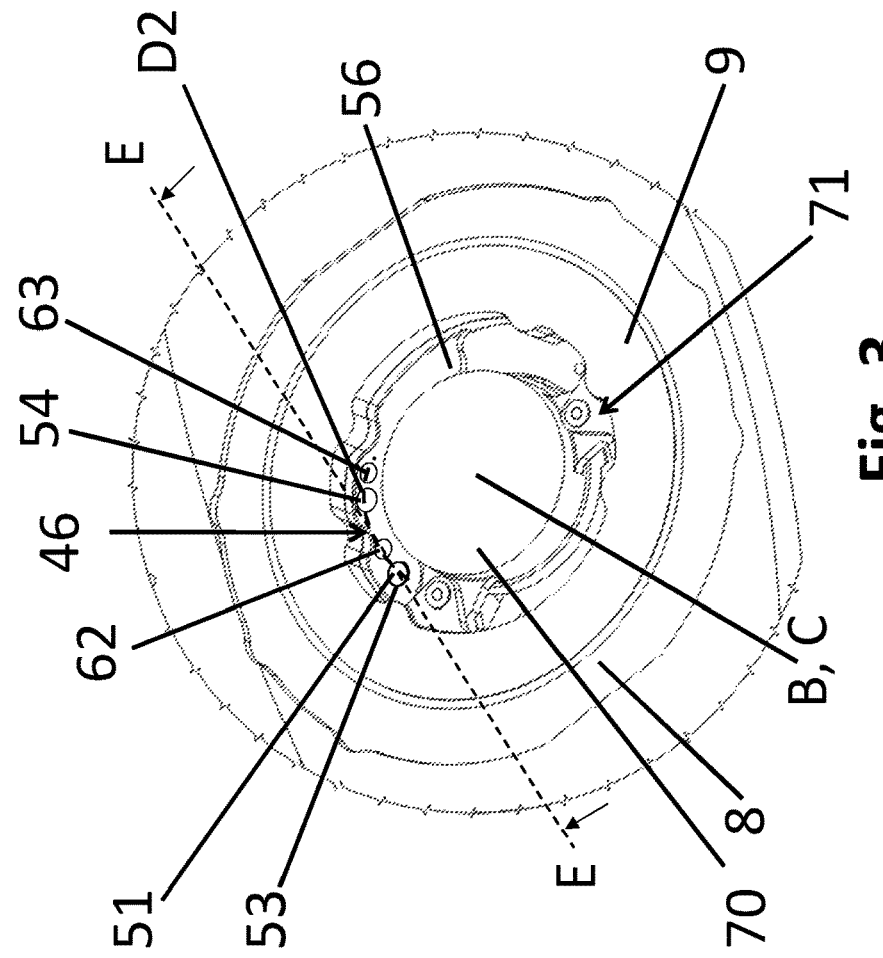

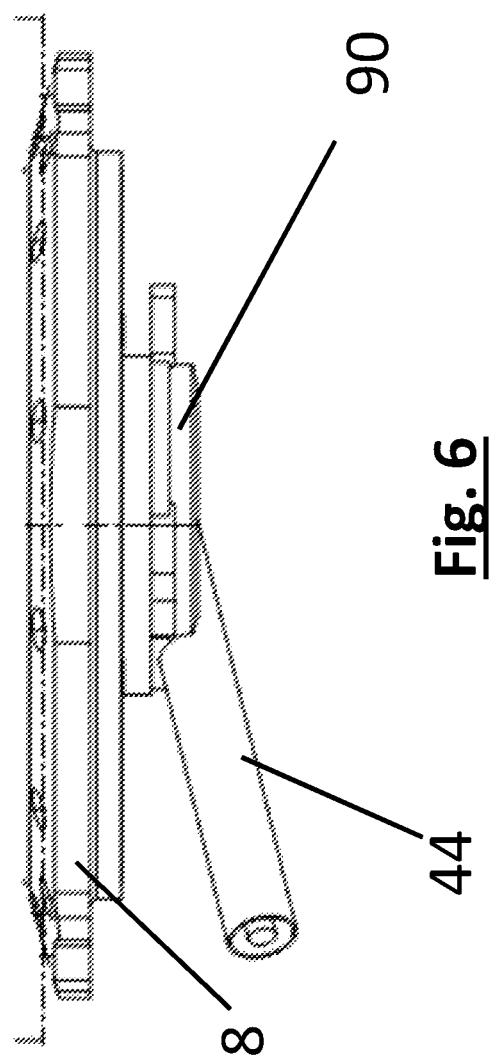

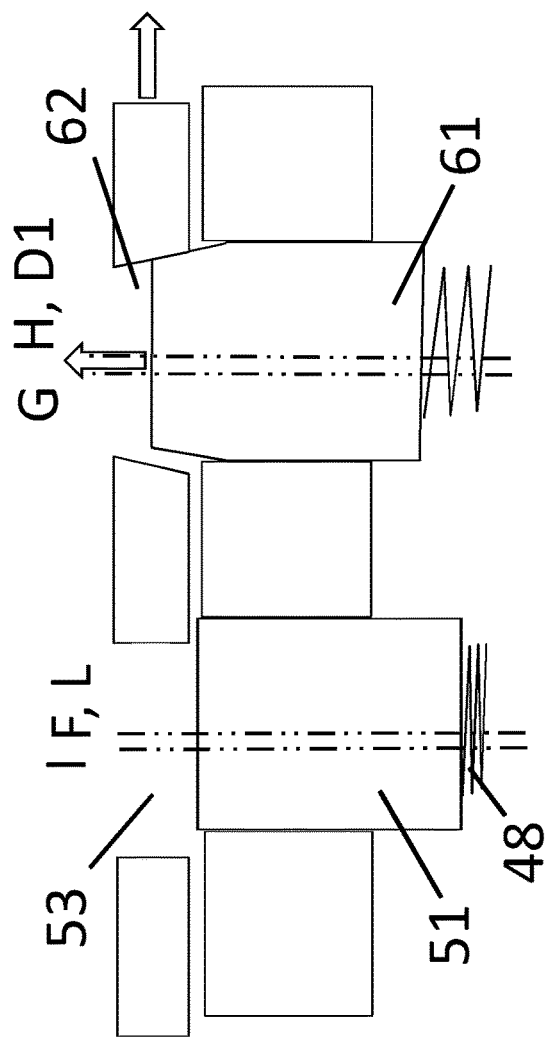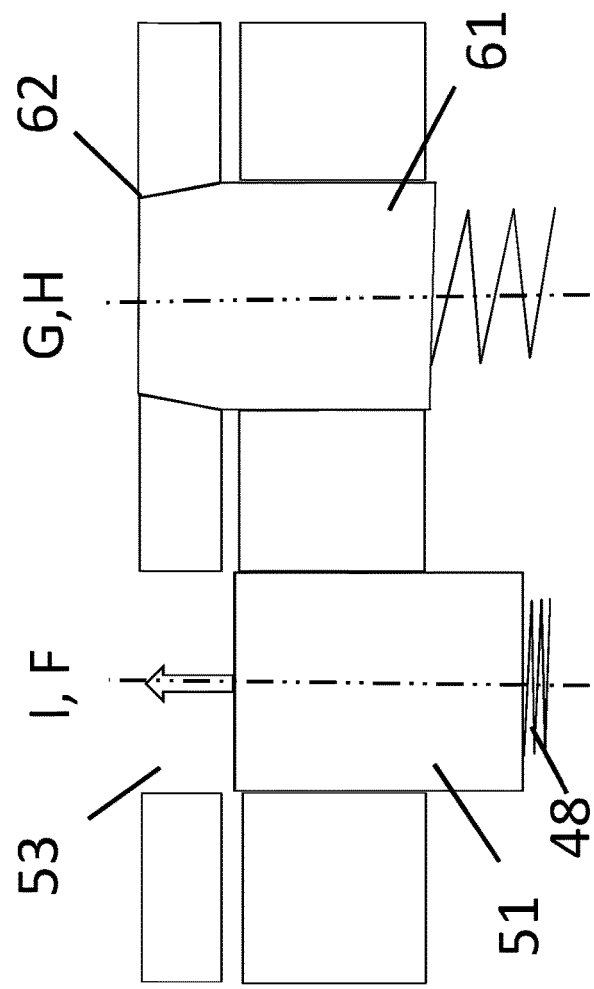

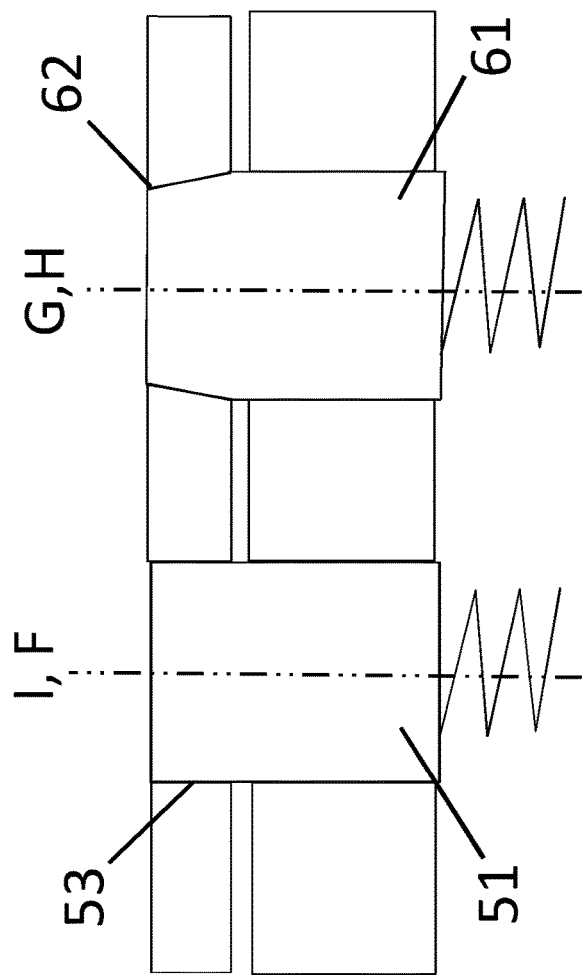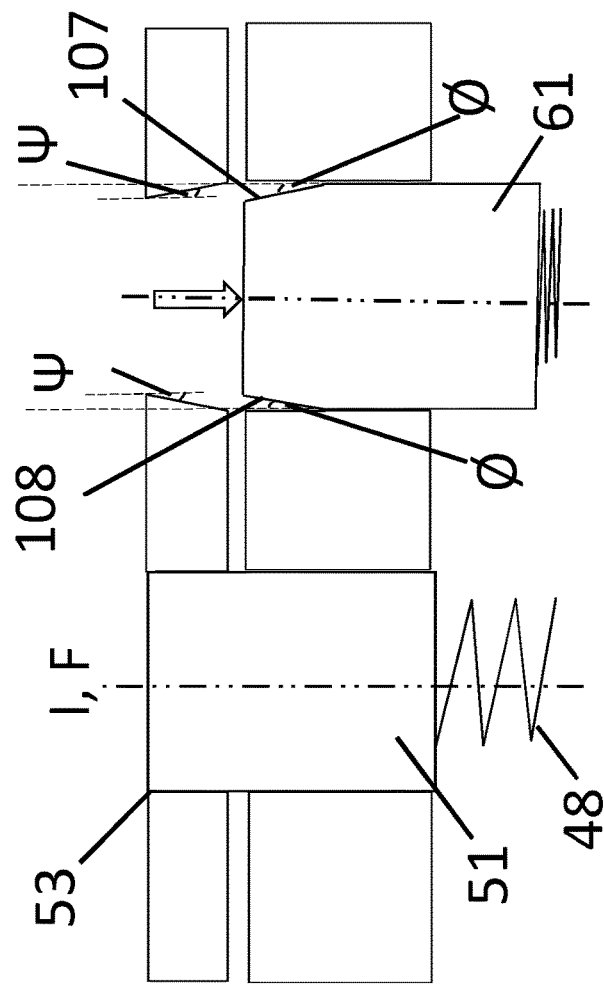

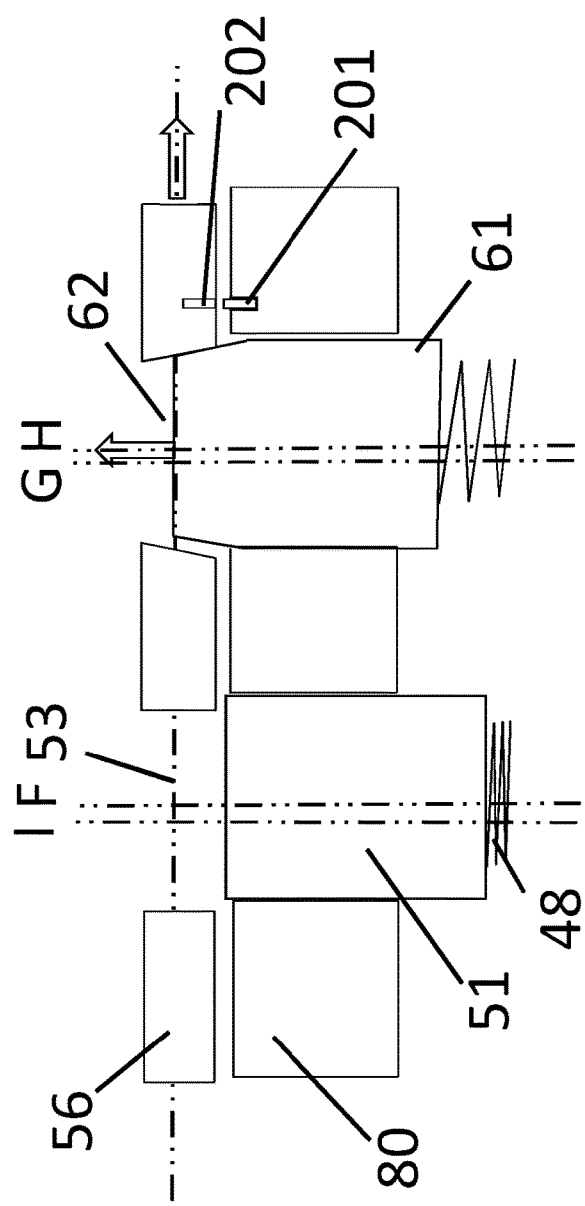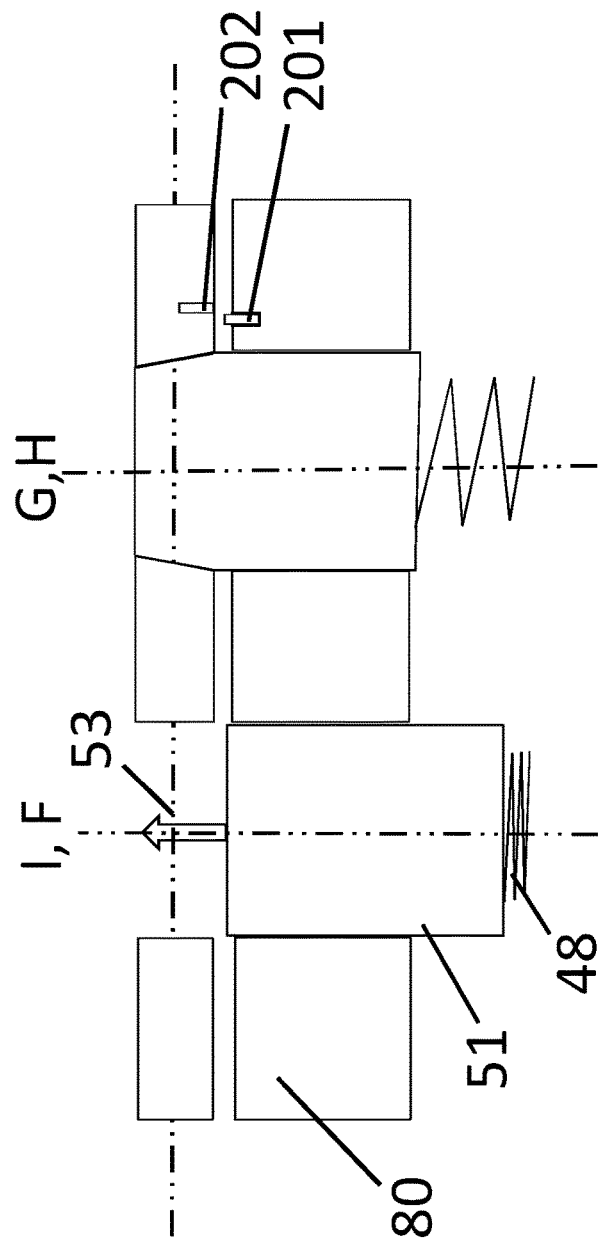

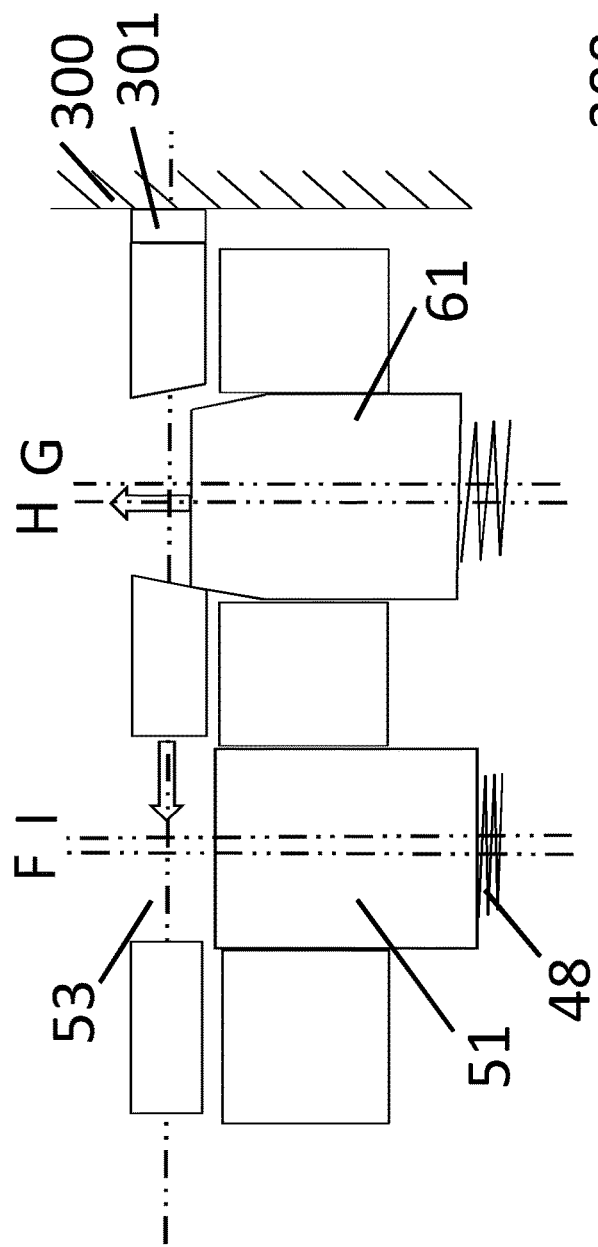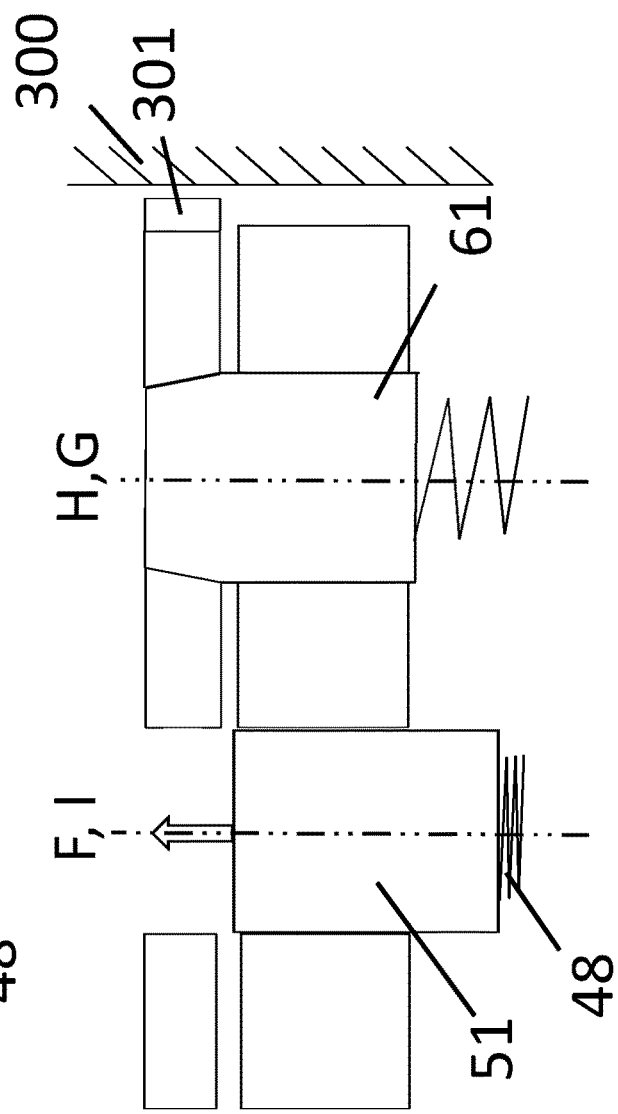

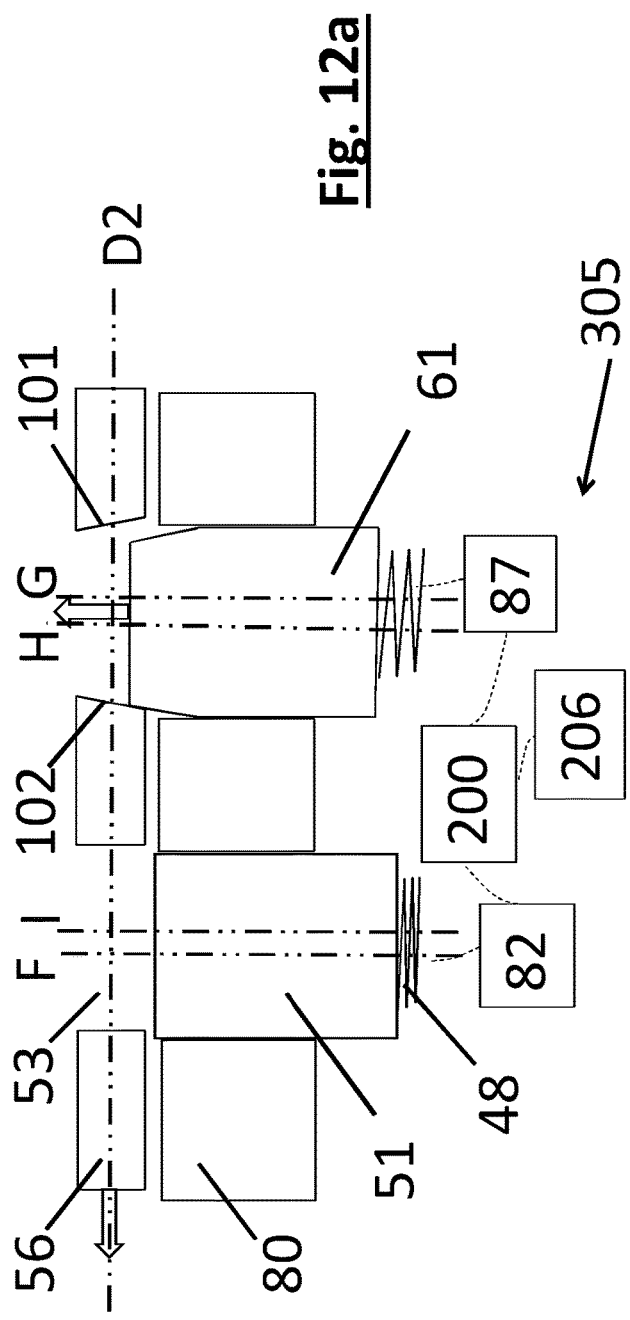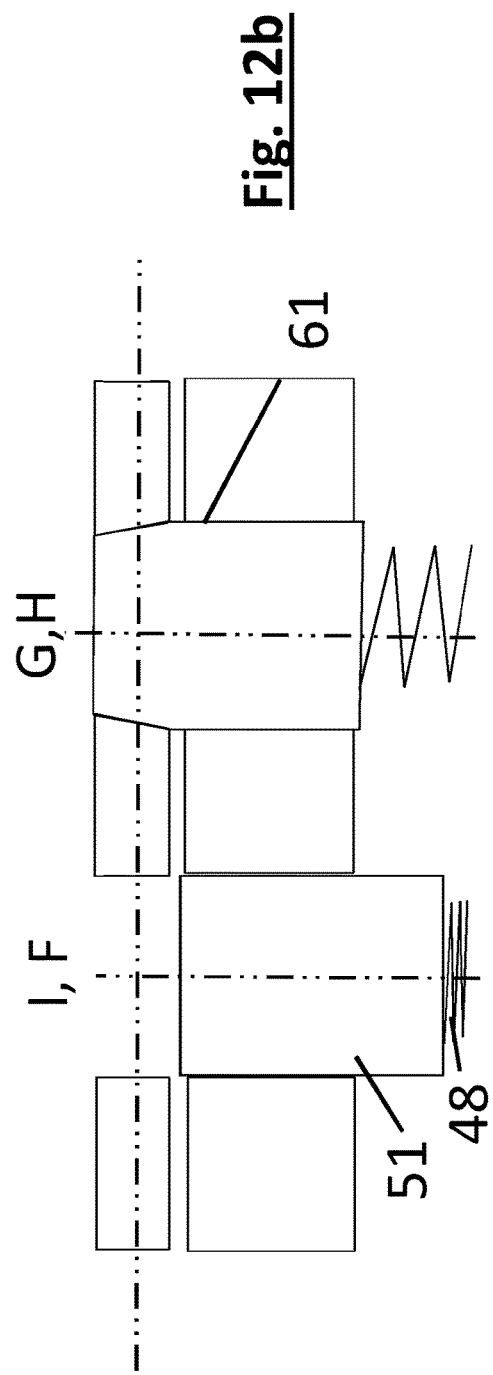

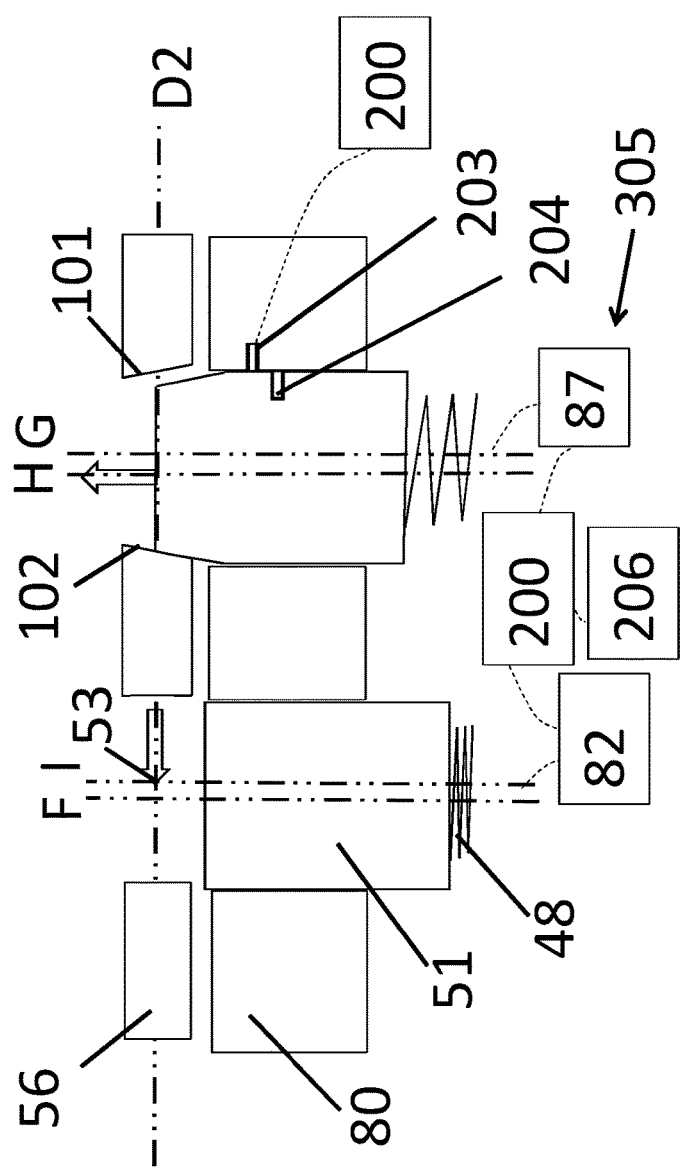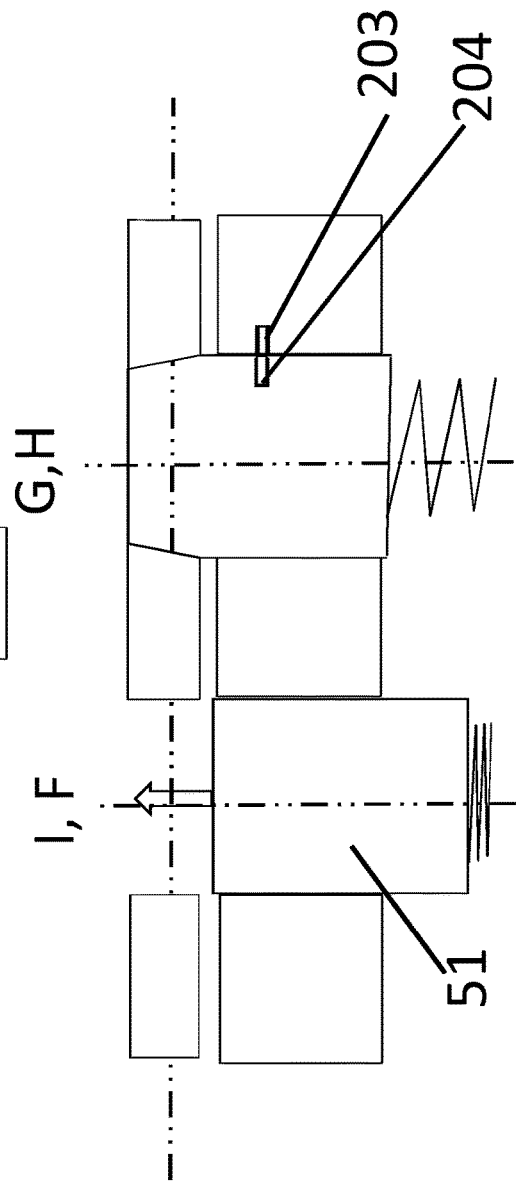

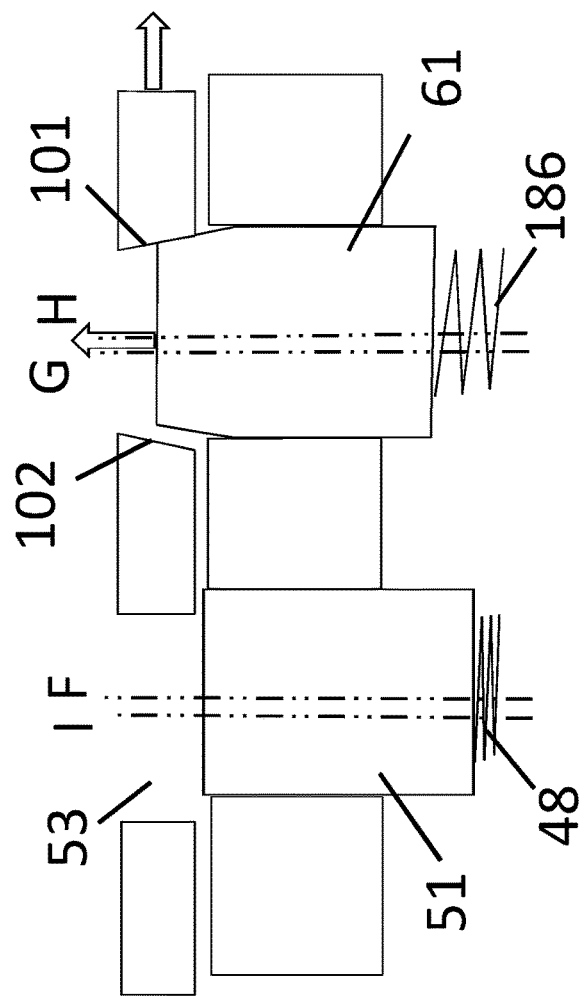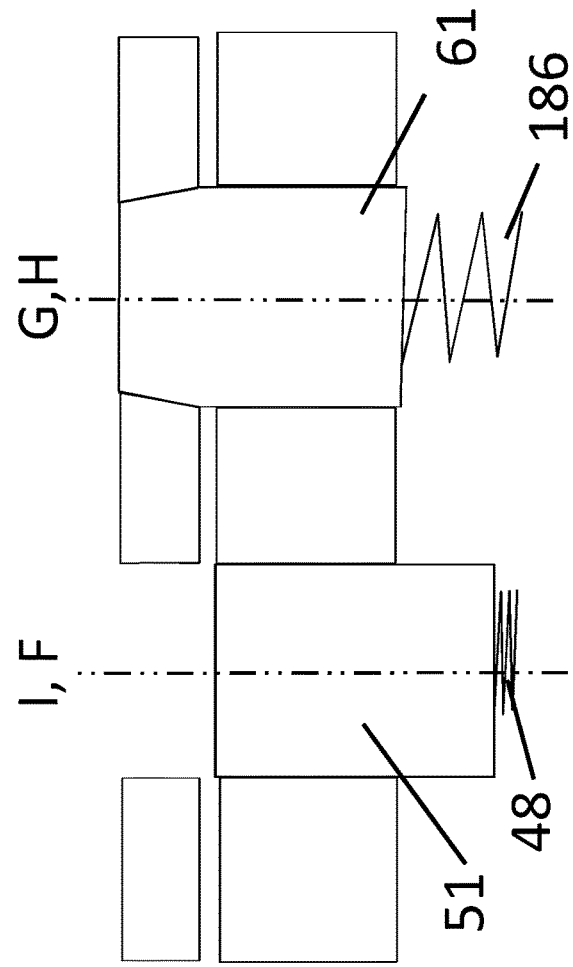

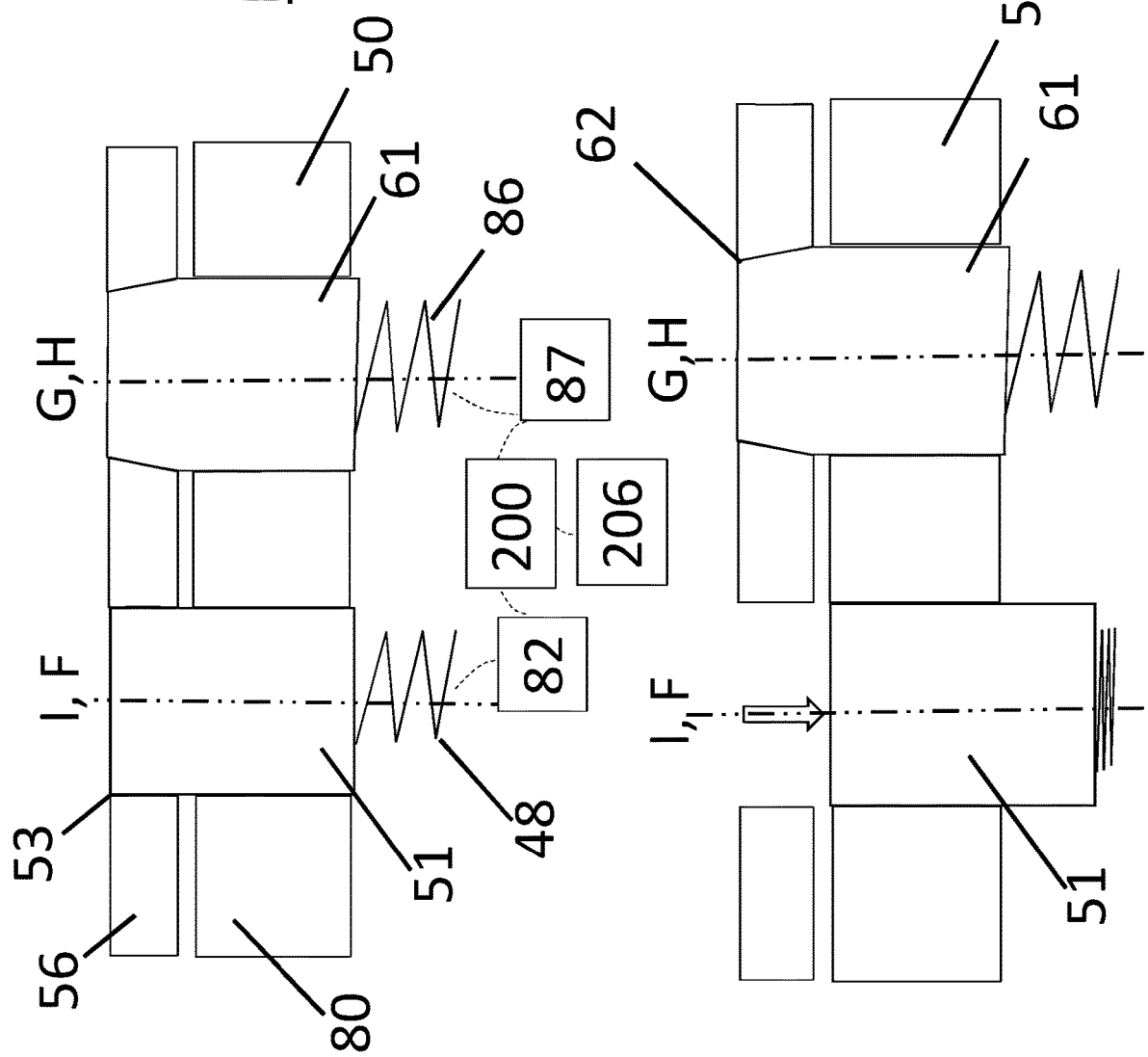

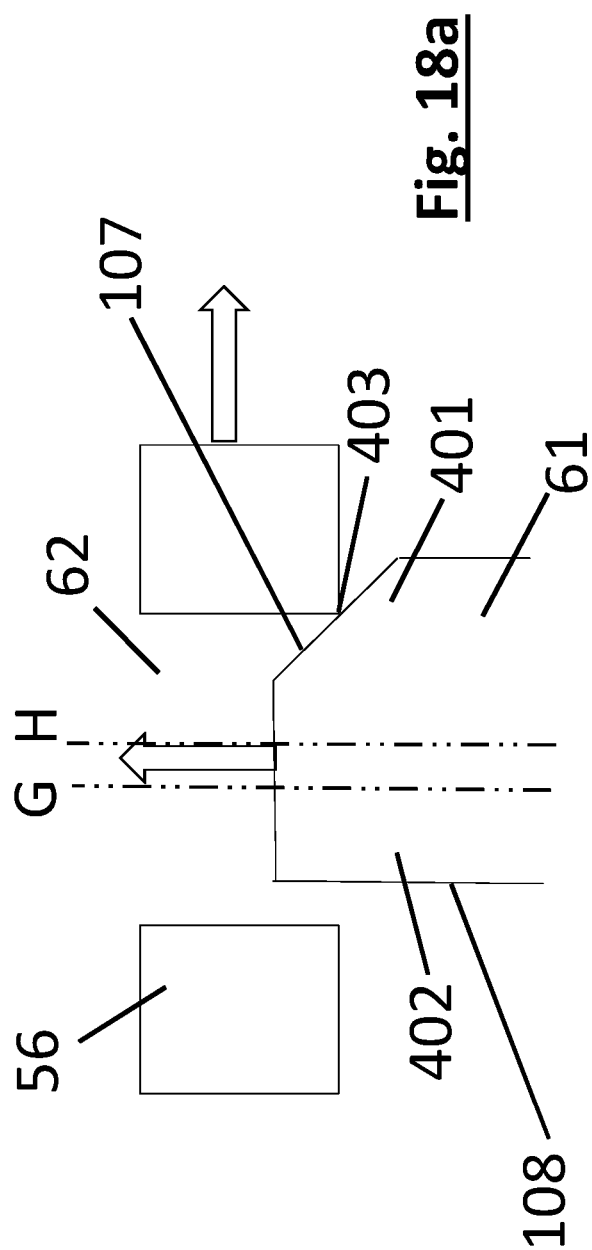
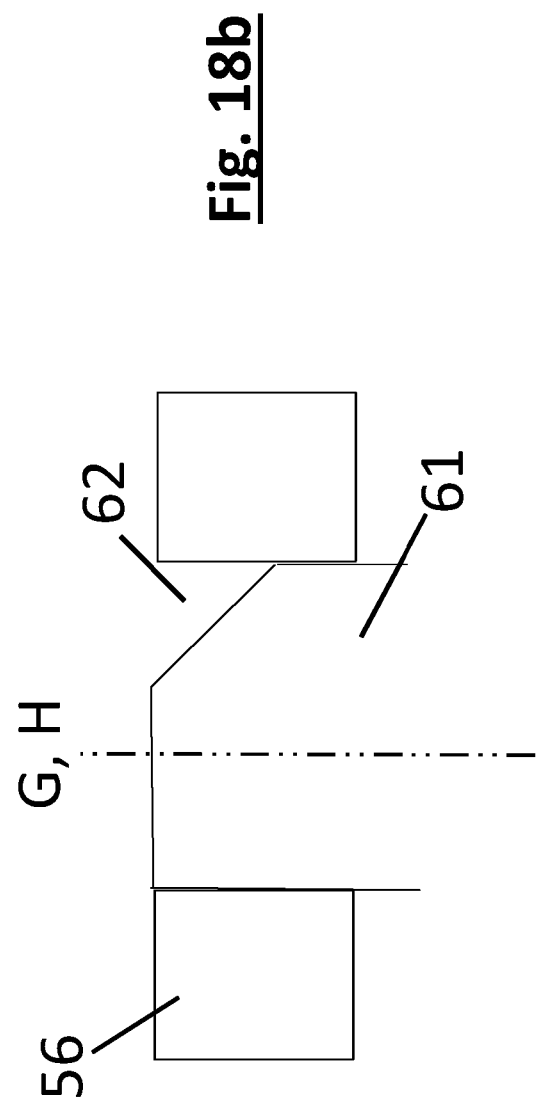

ROTATIONAL JOINT FOR AN AIRCRAFT FOLDING WING

RELATED APPLICATION

This application claims priority to United Kingdom (GB) patent application 1701850.8 filed Feb. 3, 2017, the entirety of which is incorporated by reference.

BACKGROUND OF THE INVENTION

The present invention relates to aircraft comprising foldable wings, and to rotational joints for use on such aircraft.

There is a trend towards increasingly large passenger aircraft with higher performance efficiency (for example fuel burn reduction), for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage).

In some suggested designs aircraft are provided with wings which may have wing tips that are foldable to reduce the span of the aircraft on the ground (compared to when the aircraft is configured for flight). However such folding wings are relatively complex to design and build and present a number of design obstacles.

The present invention seeks to address or mitigate at least some of the above mentioned problems. Alternatively, or additionally, the present invention seeks to provide an improved aircraft with a wing tip device that is rotatable relative to the fixed wing. Alternatively, or additionally, the present invention seeks to provide an improved aircraft wing that comprises a wing tip device that is rotatable relative to the fixed wing. Alternatively, or additionally, the present invention seeks to provide an improved rotational joint for a wing tip device that is rotatable relative to a fixed wing. Alternatively, or additionally, the present invention seeks to provide an improved method of locking a wing tip device in a flight or ground configuration. Alternatively, or additionally, the present invention seeks to provide an improved method of unlocking a wing tip device in a flight or ground configuration.

SUMMARY OF THE INVENTION

According to a first aspect of the invention there is provided an aircraft comprising a wing, the wing comprising a fixed wing and a wing tip device at the tip of the fixed wing, the wing tip device being rotatable relative to the fixed wing between a flight configuration for use during flight, and a ground configuration for use during ground-based operations, in which ground configuration the wing tip device is rotated relative to the fixed wing such that the span of the wing is reduced, the aircraft wing comprising a rotational joint comprising a rotation mechanism that rotatably couples the wing tip device to the fixed wing, to allow the wing tip device to rotate relative to the fixed wing between the flight and ground configurations, and a locking mechanism comprising a locking bore and a locking pin that is receivable in the locking bore to lock the wing tip device in one of the flight or ground configurations, wherein the rotational joint further comprises an alignment mechanism comprising an alignment pin and an alignment bore and at least one of the alignment pin and alignment bore is tapered such that engagement of the alignment pin in the alignment bore acts to guide the locking bore and locking pin into alignment.

This is advantageous in that the alignment mechanism may allow for the locking bore to be accurately aligned with the locking pin, despite any tolerances and/or elasticity in the rotational joint (or in the aircraft generally). This may allow the locking pin to form a close-fit with the locking bore, which reduces concentrated loading on the locking pin and reduces backlash in the rotational joint under loading.

Furthermore, the alignment mechanism provides this alignment function separately to the locking pin and locking bore, so the locking pin and locking bore do not need to comprise any alignment features themselves, for example by tapering the locking pin and/or locking bore. This avoids large stresses being exerted on the locking pin, during use. In addition, it avoids radial loads being transmitted into axial loads. This therefore allows the locking mechanism, and rotational joint as a whole, to be simpler, lighter and smaller. This is particularly advantageous with aircraft.

Optionally the alignment pin is arranged to first engage a leading side of the alignment bore. Optionally the aircraft comprises a control system configured such that the alignment pin first engages a leading side of the alignment bore. In embodiments of the invention, the 'leading side' of the alignment bore is the side of the alignment bore that is forward most in the subsequent direction of rotation of the alignment bore relative to the alignment pin (i.e. in the direction of the local tangent to the direction of rotation) following contact of the alignment pin with a surface of the alignment bore (i.e. a surface that defines the alignment bore) (the next direction of rotation following the contact).

For example, where the alignment bore continues in the same direction after the alignment pin contacts a surface of the alignment bore, the leading side of the alignment bore is the forward most side in that direction of rotation. Where the alignment bore rotates in a reverse direction, after the alignment pin contacts a surface of the alignment bore, the leading side of the alignment bore is the forward most side in that reverse direction of rotation. It will be appreciated that the trailing side is the opposite side of the alignment bore (i.e. rear most in the subsequent direction of rotation of the alignment bore relative to the alignment pin). It will also be appreciated that a 'side' of a bore refers to a side of a surface that defines the bore (at least in part).

Arranging the alignment pin to first engage a leading side of the alignment bore is advantageous in that it may prevent the alignment pin jamming in the alignment bore, during the subsequent rotation, before the alignment pin reaches an end position in the alignment bore in which the locking bore and locking pin are aligned.

Optionally the aircraft comprises a control system arranged to detect when the alignment bore is positioned relative to the alignment pin such that the alignment pin will first engage a leading side of the alignment bore and to engage the alignment pin in the alignment bore when said position of the alignment bore is detected.

Optionally the control system comprises a sensor arranged to detect when the alignment bore is positioned relative to the alignment pin such that the alignment pin will first engage a leading side of the alignment bore and an alignment pin actuator arranged to engage the alignment pin in the alignment bore when said position of the alignment bore is detected.

The sensor may be any suitable type of sensor, including an electric sensor, mechanical sensor (e.g. a mechanical switch), magnetic sensor, electro-mechanical sensor, etc. Alternatively, no sensor may be used. For example the control system may be based on timing and/or gearing of the rotational joint.

Optionally the aircraft is arranged such that after the alignment pin contacts a leading side of the alignment bore, the alignment bore rotates in the same direction as it was moving immediately prior to its contact with the alignment pin. In this case, the tolerances and/or elasticity of the aircraft, particularly the rotational joint, may be low enough to allow this. Optionally the aircraft comprises a control system configured such that after the alignment pin contacts a leading side of the alignment bore, the alignment bore rotates in the same direction as it was moving immediately prior to its contact with the alignment pin.

Optionally the aircraft comprises a control system arranged such that when the wing tip device is rotated to the one of the flight or ground configurations, the control system effects the following steps:
(i) the alignment bore is positioned in an over-travel position relative to the alignment pin;
(ii) the alignment pin is then engaged in the alignment bore, with the alignment bore in the over-travel position;
(iii) the alignment bore is then rotated relative to the alignment pin in a reverse direction, relative to when the wing tip device was rotated to the one of the flight or ground configurations.

This is advantageous in that it ensures that the alignment pin first engages a leading side of the alignment bore, despite the tolerances and/or elasticity in the rotational joint/aircraft. This prevents jamming of the alignment pin in the alignment bore.

Optionally the control system comprises a mechanical stop arranged to position the alignment bore, relative to the alignment pin, in the over-travel position.

Optionally the mechanical stop is rotationally fixed relative to one of the wing tip device and the fixed wing and an abutment is rotationally fixed relative to the other of the wing tip device and the fixed wing such that as the wing tip device rotates the abutment rotates relative to the mechanical stop, wherein the abutment and mechanical stop are arranged such that when the wing tip device is rotated to the one of the flight or ground configurations, the abutment and mechanical stop abut each other to position the alignment bore, relative to the alignment pin, in the over-travel position.

Optionally the aircraft comprises a control system arranged such that if the alignment pin is prevented from reaching an end position in the alignment bore, in which the locking bore and locking pin are aligned, then the alignment bore is rotated relative to the alignment pin in a reverse direction.

Optionally the aircraft comprises a control system is arranged to carry out a method comprising the steps:
(i) If the alignment pin is prevented from reaching an end position in the alignment bore, in which the locking bore and locking pin are aligned, the alignment bore is then rotated relative to the alignment pin in a reverse direction;
(ii) If the alignment pin is subsequently prevented from reaching its end position in the alignment bore, step (i) is repeated until the alignment pin reaches its end position.

Optionally the control system comprises a wing tip device actuator arranged to rotate the wing tip device between the flight and ground configurations.

Optionally the control system is arranged such that if the wing tip device actuator stalls, the wing tip device actuator is rotated in the reverse direction (i.e. the reverse direction prior to the stall). Optionally the control system is arranged to rotate the wing tip device actuator in the reverse direction until the wing tip device actuator stalls again.

Optionally the control system is arranged to detect whether the alignment pin is in its end position. The control system may comprise a sensor configured to detect when the alignment pin is in its end position. The sensor may be any suitable type of sensor, including an electric sensor, mechanical sensor (e.g. a mechanical switch), magnetic sensor, electro-mechanical sensor, etc.

Optionally the control system is configured so that step (ii) is only carried out a pre-determined number of times, preferably only once (i.e. so that step (i) is only carried out twice).

The control system may comprise an alignment pin actuator arranged to engage the alignment pin with the alignment bore. The control system may comprise a locking pin actuator arranged to engage the locking pin with the locking bore. A control unit may be arranged to control the alignment pin actuator. A control unit may be arranged to control the locking pin actuator.

Optionally the aircraft comprises a control system arranged such that once the locking pin and locking bore have been aligned, by the alignment mechanism, the locking pin is received in the locking bore.

Optionally an alignment pin actuator is arranged to bias the alignment pin into engagement with the alignment bore. The alignment pin actuator may be resiliently deformable. The alignment pin actuator may be a spring.

Optionally an alignment pin actuator is arranged to actuate the engagement of the alignment pin in the alignment bore and wherein the alignment pin actuator is configured to actuate the engagement with a force that is small enough that it does not drive the locking pin and locking bore into alignment.

Optionally an alignment pin actuator is arranged to actuate the engagement of the alignment pin in the alignment bore and wherein the alignment pin actuator is configured to actuate the engagement with a force that is large enough that it drives the locking pin and locking bore into alignment.

Optionally the at least one of the alignment pin and alignment bore is conical. It will be appreciated that 'conical' includes a complete cone, as well as a truncated cone, or frustum of a cone.

Optionally the at least one of the alignment pin and alignment bore is frusto-conical. Optionally the at least one of the alignment pin and alignment bore has the shape of a frustum of a cone, preferably a frustum of a cone that does not include the apex of the cone. The frustum is preferably a right frustum. Optionally the at least one of the alignment pin and alignment bore has the shape of a truncated cone, preferably a truncated right circular cone.

In embodiments of the invention the alignment bore has a first end that first receives a first end of the alignment pin, as the alignment pin is received in the alignment bore.

In embodiments of the invention, where the alignment bore is tapered it increases in width towards its first end. In embodiments of the invention, where the alignment pin is tapered it increases in width away from its first end. In embodiments of the invention the first end of the alignment bore is wider than the first end of the alignment pin.

In embodiments of the invention the alignment pin engages in the alignment bore by sliding contact with at least one side of the alignment bore.

Optionally the at least one of the alignment pin and alignment bore has a taper angle of greater than or equal to 3°.

Preferably the at least one of the alignment pin and alignment bore has a taper angle is greater than or equal to 7°. More preferably the at least one of the alignment pin and alignment bore has a taper angle of 10°.

Preferably the at least one of the alignment pin and alignment bore has a taper angle that is less than or equal to 45°, more preferably less than or equal to 30°, still more preferably less than or equal to 20°.

In embodiments of the invention, the taper angle is the angle that a side, of the at least one of the alignment pin and alignment bore, that defines the taper, is inclined relative to the longitudinal axis, of the at least one of the alignment pin and alignment bore. Where this side is curved, about the longitudinal axis, the taper angle is the taper angle at each circumferential position about the longitudinal axis, in a local radial plane (a plane that is parallel to the local radial direction and the longitudinal axis).

The taper angle may vary with circumferential position about the longitudinal axis. Preferably the at least one of the alignment pin and alignment bore has a taper angle that is substantially constant with circumferential position about the longitudinal axis of the at least one of the alignment pin and alignment bore.

In embodiments of the invention, where the at least one of the alignment pin and alignment bore is conical (e.g. frusto-conical), the taper angle is the half angle of the conical shape (i.e. the half angle of the cone that would formed if the cone was not truncated).

Optionally the at least one of the alignment pin and alignment bore is axisymmetric (i.e. about its longitudinal axis).

Optionally both the alignment pin and alignment bore are tapered. It will be appreciated that, in this case, the alignment pin and/or the alignment bore may have any of the above mentioned shapes.

Optionally the alignment bore and alignment pin have substantially the same taper angle. Optionally the alignment bore and alignment pin have substantially the same shape.

In embodiments of the invention, when the alignment pin is in an end position in the alignment bore, the alignment bore is positioned such that the locking bore and locking pin are aligned. Optionally when the alignment pin is in the end position, it forms a close-fit with the alignment bore.

Optionally the alignment bore and alignment pin are arranged such that the alignment pin is engageable in the alignment bore for the range of possible positions of the alignment bore relative to the alignment pin, when the wing tip device is in the one of the flight or ground configurations, due to tolerances and/or elasticity of the aircraft, preferably due to tolerances and/or elasticity of the rotational joint.

In this regard, optionally the at least one of the alignment pin and alignment bore that is tapered has a maximum width such that the alignment pin is engageable in the alignment bore for the range of possible positions of the alignment bore relative to the alignment pin, when the wing tip device is in the one of the flight or ground configurations, due to tolerances and/or elasticity of the aircraft, preferably due to tolerances and/or elasticity of the rotational joint.

Optionally when the locking pin is received in the locking bore, the locking pin forms a close-fit with the locking bore.

Optionally the locking pin is not tapered. In this regard, optionally the locking pin has a substantially constant width along its length. Optionally surfaces of the locking pin that are arranged to contact surfaces of the locking bore, so as to lock the wing tip device in the one of the flight or ground configuration, are substantially parallel to the longitudinal axis of the locking pin. Optionally the section of the locking pin that is received in the locking bore, to lock the wing tip device in the one of the flight or ground configuration, is not tapered.

Optionally the locking bore is not tapered. In this regard, optionally the locking bore has a substantially constant width along its length. Optionally surfaces of the locking bore that are arranged to contact surfaces of the locking pin, so as to lock the wing tip device in the one of the flight or ground configurations, are substantially parallel to the longitudinal axis of the locking bore. Optionally the section of the locking bore that receives the locking pin, to lock the wing tip device in the one of the flight or ground configurations, is not tapered.

In embodiments of the invention the alignment pin has no locking function. In this respect, in embodiments of the invention, the alignment pin is not used to lock the wing tip device in the one of the flight or ground configurations.

Optionally the aircraft, for example the control system, is configured such that the alignment pin is engaged in the alignment bore, to guide the locking bore and locking pin into alignment, before the locking pin is received in the locking bore to lock the wing tip device in the one of the flight or ground configurations.

In embodiments of the invention a locking actuator is configured to actuate relative movement of the locking pin and locking bore such that the locking pin is received in the locking bore, to lock the wing tip device in the one of the flight or ground configurations.

The locking actuator may be of any suitable type, including an electro-mechanical actuator (e.g. a solenoid), a pneumatic actuator or a hydraulic actuator, for example.

Optionally the locking mechanism is a first locking mechanism and the rotational joint comprises a second locking mechanism comprising a locking bore and a locking pin that is receivable in the locking bore to lock the wing tip device in the other of the flight or ground configurations, wherein the alignment mechanism is a first alignment mechanism and the rotational joint further comprises a second alignment mechanism comprising an alignment pin and an alignment bore and at least one of the alignment pin and alignment bore is tapered such that engagement of the alignment pin in the alignment bore acts to guide the locking bore and locking pin, of the second locking mechanism, into alignment.

In embodiments of the invention the second alignment mechanism is coupled to the second locking mechanism.

The locking pin of the first locking mechanism may be the same as the locking pin of the second locking mechanism. However, in embodiments of the invention, the locking bore of the first locking mechanism is a different bore to the locking bore of the second locking mechanism. In this regard, optionally the locking bore of the first locking mechanism is a first locking bore and the locking bore of the second locking mechanism is a second locking bore.

The alignment pin of the first alignment mechanism may be the same as the alignment pin of the second alignment mechanism. However, in embodiments of the invention, the alignment bore of the first alignment mechanism is a different bore to the alignment bore of the second alignment mechanism. In this regard, optionally the alignment bore of the first alignment mechanism is a first alignment bore and the alignment bore of the second alignment mechanism is a second alignment bore.

The second locking mechanism may have any of the features of the first locking mechanism.

The second alignment mechanism may have any of the features of the first alignment mechanism.

Optionally as the wing tip device rotates between the flight and ground configurations, the locking bore is rotated relative to the locking pin.

Optionally as the wing tip device rotates between the flight and ground configurations, the alignment bore is rotated relative to the alignment pin.

In embodiments of the invention the alignment mechanism is coupled to the locking mechanism. Optionally the alignment mechanism is coupled to the locking mechanism such that the rotation of the locking bore relative to the locking pin is coupled to a rotation of the alignment bore relative to the alignment pin. Optionally as the wing tip device rotates between the flight and ground configurations, the alignment bore and alignment pin rotate relative to each other, and the locking bore and locking pin rotate relative to each other, about a common rotational axis.

It will be appreciated that references to the alignment bore and alignment pin rotating relative to each other, and to the locking bore and locking pin rotating relative to each other, refer to relative rotations about a common rotational axis. In this regard, it will be appreciated that this does not refer to the alignment pin rotating about its longitudinal axis relative to the alignment bore or to the locking pin rotating about its longitudinal axis relative to the locking bore, but to the respective pins and bores orbiting around a common rotational axis, relative to each other. Optionally the common rotational axis is the rotational axis that the wing tip device rotates about as it rotates between the flight and ground configurations.

Optionally the locking bore is rotationally fixed relative to the wing tip device, to rotate with the wing tip device and the locking pin is rotationally fixed relative to the fixed wing.

In embodiments of the invention the alignment bore is rotationally fixed relative to the wing tip device, to rotate with the wing tip device and the alignment pin is rotationally fixed relative to the fixed wing.

Optionally the locking mechanism is configured to lock the rotation mechanism so as to lock the wing tip device in the one of the flight or ground configurations.

Optionally the rotation mechanism comprises a follower and guide, the follower being rotationally fixed relative to the wing tip device and the guide being rotationally fixed relative to the fixed wing such that as the wing tip device rotates, the follower is rotated relative to the guide. Optionally the guide is arranged to guide the relative rotation of the follower. Optionally the locking bore and alignment bore are rotationally fixed relative to the follower, to rotate with the follower, and the locking pin and alignment pin are rotationally fixed relative to the guide. Optionally the locking bore and alignment bore are each provided in the follower. Optionally each of the locking pin and alignment pin are slidably mounted to the guide, for movement into and out of the locking bore and alignment bore respectively.

Optionally the follower comprises a first ring and the guide comprises a second ring, the first and second rings being concentric. Optionally the first ring is located radially inwardly of the second ring. Optionally the rotation mechanism comprises a slew ring. In this respect, optionally one of the first and second rings forms an inner race and the other of the first and second rings forms an outer race.

Optionally when the locking mechanism locks the rotation mechanism, it rotationally fixes the follower relative to the guide.

In embodiments of the invention the alignment pin and alignment bore are different entities to the locking pin and locking bore respectively, i.e. the alignment pin and alignment bore are not formed by the locking pin and locking bore respectively. In this respect, the alignment pin is a first pin and the locking pin is a second pin. The alignment bore is a first bore and the locking bore is a second bore. In embodiments of the invention the locking pin has a different shape to the alignment pin. In embodiments of the invention the locking bore has a different shape to the alignment bore.

In embodiments of the invention, a wing tip device actuator is arranged to rotate the wing tip device between the flight and ground configurations.

The wing tip device actuator may be arranged such that if the alignment pin is prevented from reaching its end position, the wing tip device actuator is stalled.

Optionally the wing tip device actuator is arranged to rotate the wing tip device between the flight and ground configurations by rotating the rotation mechanism. The wing tip device actuator may be arranged to drive the follower such that the follower rotates relative to the guide. The wing tip device actuator may be a rotary actuator.

Optionally the follower is coupled to the wing tip device actuator by a rotational drive member. Optionally the rotational drive member is a drive shaft. Optionally the rotational drive member is coupled to the wing tip device actuator by a transmission.

The transmission may be a reduction transmission. In this regard, the transmission may be configured to convert a high speed low torque input, from the actuator, into a low speed high torque (it will be appreciated that the terms 'high' and 'low' are being used relative to each other. The transmission may have an input to output gear ratio of 400:1, for example.

The transmission may be an epicylic transmission.

Preferably the wing tip device actuator is an electric motor. However, it will be appreciated that any suitable type of actuator may be used.

The wing tip device actuator may be a geared rotary actuator.

Optionally the aircraft comprises a control system configured to remove the locking pin from the locking bore, so as to unlock the wing tip device, whilst the alignment pin is engaged in the alignment bore. Optionally the aircraft comprises a control system configured to remove the locking pin from the locking bore, so as to unlock the wing tip device, whilst the alignment pin is located in its end position in the alignment bore. Optionally the control system is arranged to engage the alignment pin in the alignment bore, so as to align the locking pin and locking bore, whilst the locking pin is located in the locking bore.

According to a second aspect of the invention there is provided an aircraft wing comprising a fixed wing and a wing tip device at the tip of the fixed wing, the wing tip device being rotatable relative to the fixed wing between a flight configuration for use during flight, and a ground configuration for use during ground-based operations, in which ground configuration the wing tip device is rotated relative to the fixed wing such that the span of the wing is reduced, the aircraft wing comprising a rotational joint comprising a rotation mechanism that rotatably couples the wing tip device to the fixed wing, to allow the wing tip device to rotate relative to the fixed wing between the flight and ground configurations, and a locking mechanism comprising a locking bore and a locking pin that is receivable in the locking bore to lock the wing tip device in one of the flight or ground configurations, wherein the rotational joint further comprises an alignment mechanism comprising an alignment pin and an alignment bore and at least one of the alignment pin and alignment bore is tapered such that engagement of the alignment pin in the alignment bore acts to guide the locking bore and locking pin into alignment.

In embodiments of the invention the aircraft wing is for use on the aircraft of the first aspect of the invention.

The aircraft wing of the second aspect of the invention may have any of the features of the wing of the aircraft of the first aspect of the invention.

The aircraft wing may comprise the control system of the aircraft of the first aspect of the invention.

According to a third aspect of the invention there is provided a rotational joint for use as the rotational joint of the first aspect of the invention, the rotational joint comprising a rotation mechanism for rotatably coupling a wing tip device to a fixed wing, to allow the wing tip device to rotate relative to the fixed wing between a flight configuration for use during flight, and a ground configuration for use during ground-based operations, in which ground configuration the wing tip device is rotated relative to the fixed wing such that the span of the wing is reduced, and a locking mechanism comprising a locking bore and a locking pin that is receivable in the locking bore to lock the wing tip device in one of the flight or ground configurations, wherein the rotational joint further comprises an alignment mechanism comprising an alignment pin and an alignment bore and at least one of the alignment pin and alignment bore is tapered such that engagement of the alignment pin in the alignment bore acts to guide the locking bore and locking pin into alignment.

The rotational joint of the third aspect of the invention may have any of the features of the rotational joint of the aircraft of the first aspect of the invention.

The rotational joint may comprise the control system of the aircraft of the first aspect of the invention.

According to a fourth aspect of the invention there is provided a method of locking a wing tip device of an aircraft in a flight or ground configuration, the aircraft comprising a wing, the wing comprising a fixed wing and a wing tip device at the tip of the fixed wing, the wing tip device being rotatable relative to the fixed wing between a flight configuration for use during flight, and a ground configuration for use during ground-based operations, in which ground configuration the wing tip device is rotated relative to the fixed wing such that the span of the wing is reduced, the aircraft wing comprising a rotational joint comprising a rotation mechanism that rotatably couples the wing tip device to the fixed wing, to allow the wing tip device to rotate relative to the fixed wing between the flight and ground configurations, and a locking mechanism comprising a locking bore and a locking pin that is receivable in the locking bore to lock the wing tip device in one of the flight or ground configurations, wherein the rotational joint further comprises an alignment mechanism comprising an alignment pin and an alignment bore and at least one of the alignment pin and alignment bore is tapered, wherein the method comprises firstly engaging the alignment pin in the alignment bore to guide the locking bore and locking pin into alignment, and subsequently receiving the locking pin in the locking bore to lock the wing tip device in the one of the flight or ground configurations.

Optionally the alignment pin first engages a leading side of the alignment bore.

Optionally the method comprises detecting when the alignment bore is positioned relative to the alignment pin such that the alignment pin will first engage a leading side of the alignment bore and actuating the alignment pin to engage the leading side of the alignment bore when said position of the alignment bore is detected.

Optionally after the alignment pin contacts a leading side of the alignment bore, the alignment bore rotates in the same direction as it was moving immediately prior to its contact with the alignment pin.

Optionally when the wing tip device is rotated to the one of the flight or ground configurations:
  (i) the alignment bore is positioned in an over-travel position relative to the alignment pin;
  (ii) the alignment pin is then engaged in the alignment bore, with the alignment bore in the over-travel position;
  (iii) the alignment bore is then rotated relative to the alignment pin in a reverse direction, relative to when the wing tip was rotated to the one of the flight or ground configurations.

Optionally a mechanical stop is used to position the alignment bore, relative to the alignment pin, in the over-travel position.

Optionally if the alignment pin is prevented from reaching an end position in the alignment bore, in which the locking bore and locking pin are aligned, then the alignment bore is rotated relative to the alignment pin in a reverse direction.

Optionally the method comprises the steps:
  (i) If the alignment pin is prevented from reaching an end position in the alignment bore, in which the locking bore and locking pin are aligned, the alignment bore is then rotated relative to the alignment pin in a reverse direction;
  (ii) If the alignment pin is subsequently prevented from reaching its end position in the alignment bore, step (i) is repeated until the alignment pin reaches its end position.

Optionally a wing tip device actuator is arranged to rotate the wing tip device between the flight and ground configurations and wherein if the wing tip device actuator stalls, the wing tip device actuator is rotated in the reverse direction.

Optionally the method comprises detecting whether the alignment pin is in its end position.

Optionally the alignment pin is biased into engagement with the alignment bore.

Optionally the alignment pin is engaged in the alignment bore with a force that is small enough that it does not drive the locking pin and locking bore into alignment.

Optionally the alignment pin is engaged in the alignment bore with a force that is large enough that it drives the locking pin and locking bore into alignment.

Optionally the locking mechanism is a first locking mechanism and the rotational joint comprises a second locking mechanism comprising a locking bore and a locking pin that is receivable in the locking bore to lock the wing tip device in the other of the flight or ground configurations, wherein the alignment mechanism is a first alignment mechanism and the rotational joint further comprises a second alignment mechanism comprising an alignment pin and an alignment bore and at least one of the alignment pin and alignment bore is tapered, wherein the method comprises rotating the wing tip device to the other of the flight or ground configurations and engaging the alignment pin in the alignment bore to guide the locking bore and locking pin, of the second locking mechanism, into alignment, and receiving the locking pin in the locking bore to lock the wing tip device in the other of the flight or ground configurations.

Optionally as the wing tip device rotates between the flight and ground configurations, the locking bore is rotated relative to the locking pin and alignment bore is rotated relative to the alignment pin.

Optionally a control system is configured to carry out the method. The control system may have any of the features of the control system described above, in relation to the first aspect of the invention.

The method of locking the wing tip device in the other of the flight or ground configurations may comprise any of the features of the method of locking the wing tip device in the one of the flight or ground configurations.

According to a fifth aspect of the invention there is provided a method of unlocking a wing tip device of an aircraft from a flight or ground configuration, the aircraft comprising a wing, the wing comprising a fixed wing and a wing tip device at the tip of the fixed wing, the wing tip device being rotatable relative to the fixed wing between:
   a flight configuration for use during flight, and
   a ground configuration for use during ground-based operations, in which ground configuration the wing tip device is rotated relative to the fixed wing such that the span of the wing is reduced,
   the aircraft wing comprising a rotational joint comprising:
   a rotation mechanism that rotatably couples the wing tip device to the fixed wing, to allow the wing tip device to rotate relative to the fixed wing between the flight and ground configurations,
   and a locking mechanism comprising a locking bore and a locking pin that is receivable in the locking bore to lock the wing tip device in one of the flight or ground configurations,
   wherein the rotational joint further comprises an alignment mechanism comprising an alignment pin and an alignment bore and at least one of the alignment pin and alignment bore is tapered,
   wherein the method comprises removing the locking pin from the locking bore, to unlock the wing tip device from the one of the flight or ground configurations, whilst the alignment pin is engaged in the alignment bore.

This is advantageous in that it may minimise or remove shear loading on the locking pin before it is removed from the locking bore.

The alignment pin may be received in the alignment bore before or after the locking pin is received in the locking bore.

In embodiments of the invention, the method comprises removing the locking pin from the locking bore, to unlock the wing tip device from the one of the flight or ground configurations, whilst the alignment pin is engaged in the alignment bore such that the locking pin is aligned in the alignment bore.

In embodiments of the invention, the method comprises removing the locking pin from the locking bore, to unlock the wing tip device from the one of the flight or ground configurations, whilst the alignment pin is engaged in the alignment bore such that there is substantially no shear force exerted by the locking pin on the locking bore (and vice versa).

In embodiments of the invention, the method comprises removing the locking pin from the locking bore, to unlock the wing tip device from the one of the flight or ground configurations, whilst the alignment pin is in its end position in the alignment bore.

Optionally the locking mechanism is a first locking mechanism and the rotational joint comprises a second locking mechanism comprising a locking bore and a locking pin that is receivable in the locking bore to lock the wing tip device in the other of the flight or ground configurations, wherein the alignment mechanism is a first alignment mechanism and the rotational joint further comprises a second alignment mechanism comprising an alignment pin and an alignment bore and at least one of the alignment pin and alignment bore is tapered, wherein the method comprises removing the locking pin from the locking bore, to unlock the wing tip device from the other of the flight or ground configurations, whilst the alignment pin is engaged in the alignment bore.

In embodiments of the invention the at least one of the alignment pin and alignment bore is tapered such that engagement of the alignment pin in the alignment bore acts to guide the locking bore and locking pin into alignment. In the methods of the fourth and fifth aspects of the invention, the aircraft may be an aircraft according to the first aspect of the invention.

Optionally the aircraft and/or the rotational joint is arranged such that the majority of the aerodynamic and inertial loads on the wing tip device during use of the aircraft, are transferred to the fixed wing, via the rotational joint. Optionally substantially all the aerodynamic and inertial loads on the wing tip device during use of the aircraft, are transferred to the fixed wing, via the rotational joint.

The wing tip device and the fixed wing may be separated along an oblique cut plane passing through the upper and lower surfaces of the wing, the oblique cut plane being orientated normal to the axis of rotation. The oblique plane and the axis of rotation may be such that the fixed wing and the wing tip device do not clash when rotating between the flight and ground configurations. An example of a wing tip device that is rotatable in this manner is shown in WO 2015/150835. Embodiments of the present invention have been found to be especially effective in relation to this type of moveable wing tip device because of the limited internal space accessible during assembly.

The orientation of the axis is preferably such that when the wing tip device is rotated about the rotational axis, from the flight configuration to the ground configuration, the span of the aircraft wing is reduced.

The cut plane is oblique. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing.

The oblique cut plane is preferably a notional plane separating the fixed wing and the wing tip device (for example a cut plane created during the design phase of the wing). It will be appreciated that the cut plane need not necessarily manifest itself as a physical, planar, surface throughout the depth of the wing.

The axis of rotation may be orientated at an angle to (i.e. not including being parallel or perpendicular to) a longitudinal direction. The axis is preferably at an angle to (i.e. not including being parallel or perpendicular to) a lateral direction. The axis is preferably at an angle to (i.e. not including being parallel or perpendicular to) a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chord wise direction; the lateral direction may be a span wise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing.

The wing tip device is preferably rotatable about a single axis of rotation. For example, the rotation of the wing tip device is preferably not the result of a compound rotation (i.e. a net rotation created by a plurality of separate rotations about separate axes).

The angle is preferably an oblique angle. The axis is preferably at an angle of less than 45 degrees, and more preferably less than 25 degrees, from the vertical. The axis may be at an angle of 15 degrees from the vertical axis. The present invention has been found to be especially beneficial in embodiments in which the axis is at a relatively small angle from the vertical because the orientation of axis results in a shallow cut plane and the area of the interface between the fixed wing and wing tip device may therefore be relatively large.

In embodiments of the present invention, the wing tip device is configurable between: (i) a flight configuration for use during flight and (ii) a ground configuration for use during ground-based operations, in which ground configuration the wing tip device is moved away from the flight configuration such that the span of the aircraft wing is reduced.

In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft may be any air vehicle such as a manned aircraft or a UAV. More preferably the aircraft is a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention. For example, the method of any aspect of the invention may incorporate any of the features described with reference to the apparatus of any aspect of the invention and vice versa.

Other preferred and advantageous features of the invention will be apparent from the following description.

DESCRIPTION OF THE DRAWINGS

Embodiments of the present invention will now be described by way of example only with reference to the accompanying drawings of which:

FIG. 3 is a perspective view of the rotational joint shown in FIG. 2, where the wing tip device is locked in a flight configuration;

FIG. 4 is a view corresponding to that of FIG. 3, but where the wing tip device is locked in a ground configuration;

FIG. 6 shows a side view of the rotational joint shown in FIGS. 2 to 5;

FIGS. 7a to 7f show a cross-sectional view, taken along the line E-E in FIG. 3 and sequentially show the steps of locking the wing tip device in the flight configuration;

FIGS. 9a to 9c each show a view corresponding to a cross-sectional view taken along the line E-E in FIG. 3, but where the rotational joint is of an aircraft according to a second embodiment of the invention, and sequentially show steps of aligning a locking bore with the locking pin for locking the wing tip device in the flight configuration;

FIGS. 10a to 10c each show a view corresponding to a cross-sectional view taken along the line E-E in FIG. 3, but where the rotational joint is of an aircraft according to a third embodiment of the invention, and sequentially show steps of aligning a locking bore with the locking pin for locking the wing tip device in the flight configuration;

FIGS. 12a and 12b each show a view corresponding to a cross-sectional view taken along the line E-E in FIG. 3, but where the rotational joint is of an aircraft according to a fourth embodiment of the invention and sequentially shows steps of aligning a locking bore with the locking pin for locking the wing tip device in the flight configuration;

FIGS. 14a and 14b each show a view corresponding to a cross-sectional view taken along the line E-E in FIG. 3, but where the rotational joint is of an aircraft according to a fifth embodiment of the invention, and sequentially show the steps of aligning a locking bore with the locking pin for locking the wing tip device in the flight configuration;

FIGS. 16a to 16c each show a view corresponding to a cross-sectional view taken along the line E-E in FIG. 3, but where the rotational joint is of an aircraft according to a sixth embodiment of the invention, and sequentially show the steps of aligning a locking bore with the locking pin for locking the wing tip device in the flight configuration;

FIGS. 17a to 17b each show a view corresponding to a cross-sectional view taken along the line E-E in FIG. 3 and sequentially show steps of unlocking the wing tip device from the flight configuration, and FIGS. 18a to 18b show an enlarged cross-sectional view of an alignment pin and alignment bore according to a further embodiment of the invention.

DETAILED DESCRIPTION

Figure 1A:
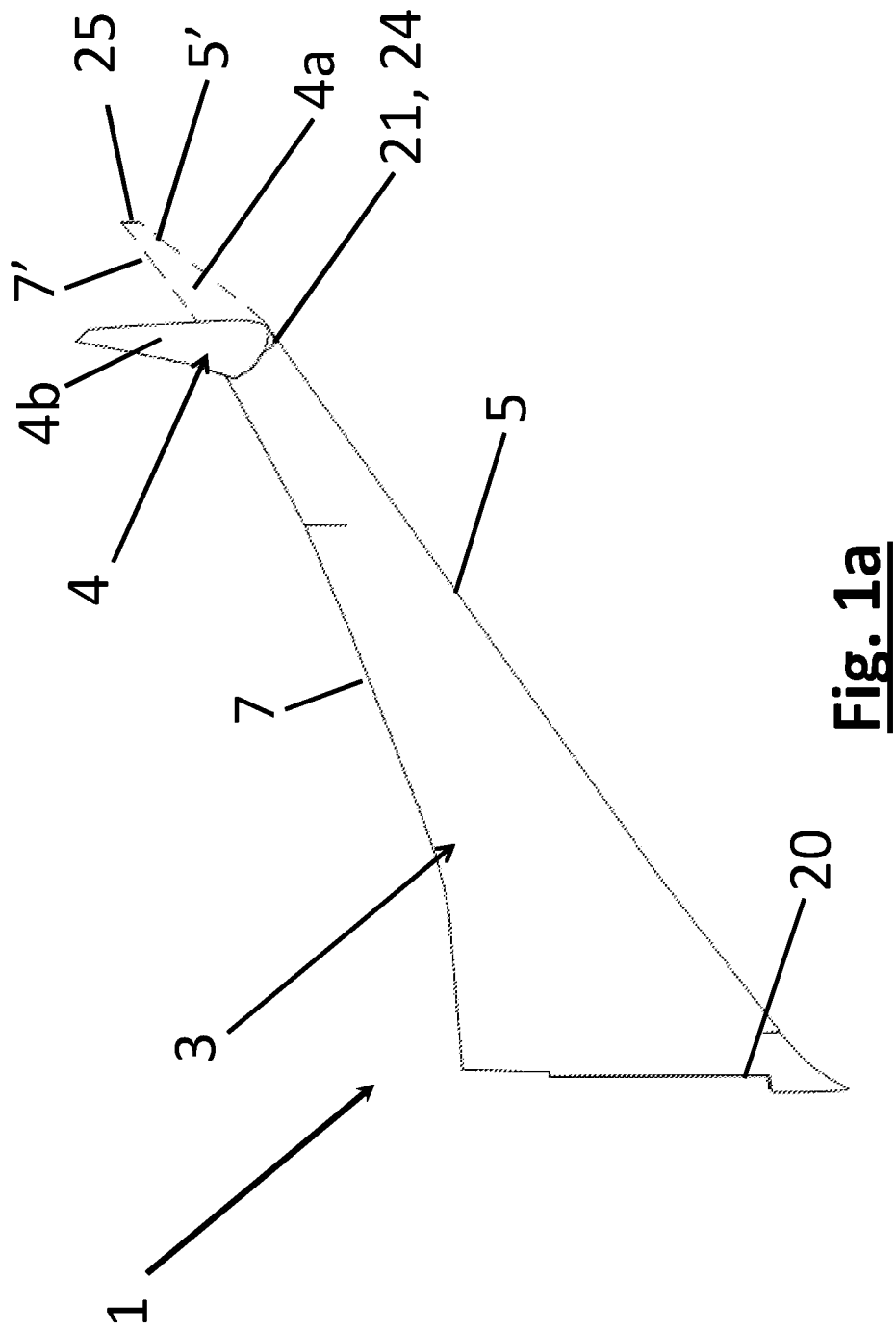
FIG. 1a shows a perspective view of a swept wing of a passenger aircraft according to a first embodiment of the invention, where a wing tip device of the wing is shown in a flight configuration (shown as a dotted line) and in a ground configuration (shown as a solid line)
Figure 1B:
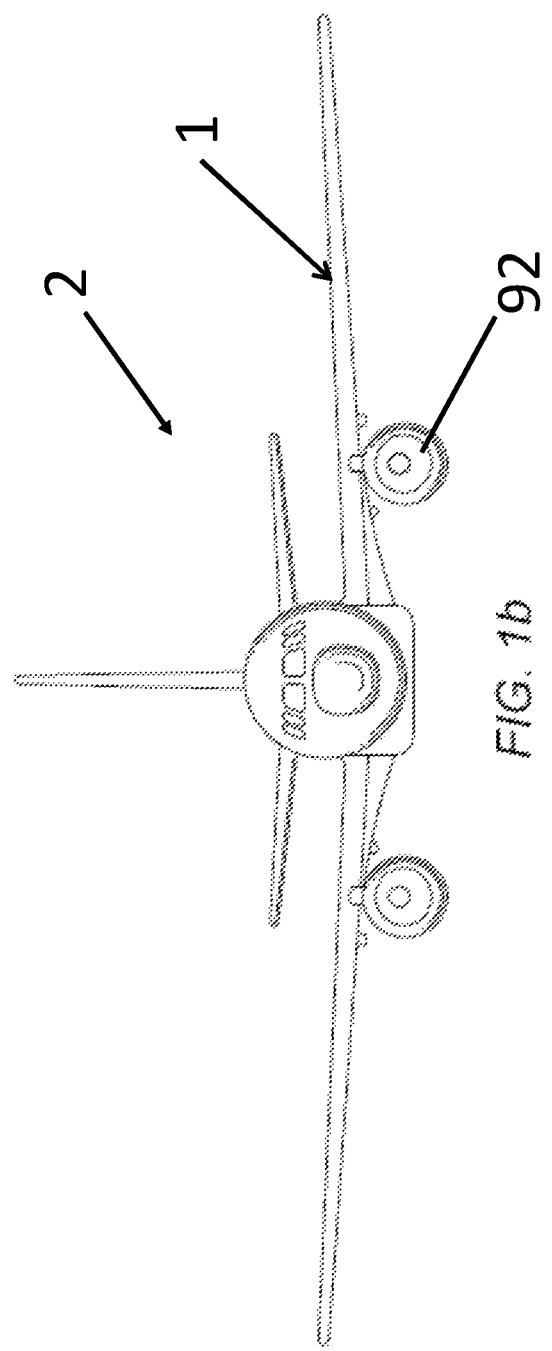
FIG. 1b shows a front view of the passenger aircraft, where the wing tip device is in the flight configuration.

FIG. 1a is a perspective view of an aircraft wing 1 of an aircraft 2 according to a first embodiment of the invention. The aircraft wing 1 comprises a fixed wing 3 and a wing tip device 4.

The aircraft 2 is a passenger aircraft comprising a passenger cabin comprising a plurality of rows and columns of seat units for accommodating a multiplicity of passengers, in this case more than 50 passengers. The aircraft is a powered aircraft and comprises engines 92, mounted under the wings 1, for propelling the aircraft 2.

The fixed wing 3 extends outboard from the fuselage of the aircraft, in a span wise direction from a root 20 to a tip 21. The fixed wing 3 also extends in a chord-wise direction from a leading edge 5 to a trailing edge 7.

The wing tip device 4 is located at the outboard tip 21 of the fixed wing 3. In the described embodiment the wing tip device 4 is in the form of a planar wing tip extension, although the invention is also applicable to other types of wing tip device (e.g. a non-planar wing tip device, such as a winglet).

The wing tip device 4 is moveable between a flight configuration 4a (shown as a dotted line in FIG. 1a) and a ground configuration 4b (shown as a solid line in FIG. 1a). When the wing tip device 4 is in the flight configuration it extends outboard in a span wise direction, from an inboard end 24, located at the tip 21 of the fixed wing 3, to a tip 25. The wing tip device 4 also extends in a chord-wise direction from a leading edge 5' to a trailing edge 7'.

In the flight configuration, the leading and trailing edges 5', 7' of the wing tip device 4 are continuations of the leading and trailing edges 5, 7 of the fixed wing 3. Furthermore, the upper and lower surfaces of the wing tip device 4 device are continuations of the upper and lower surfaces of the fixed wing 3. Thus, there is a smooth transition from the fixed wing 3 to the wing tip device 4.

It will be appreciated that there may be a smooth transition, even where there are changes in sweep or twist at the junction between the fixed wing 3 and wing tip device 4. However, there are preferably no discontinuities at the junction between the fixed wing 3 and wing tip device 4.

The wing tip device 4 is placed in the flight configuration for flight. In the flight configuration the wing tip device 4 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when maneuvering around the airport (such as the span and/or ground clearance required for gate entry and safe taxiway usage). In this regard, in the flight configuration the span may exceed an airport compatibility gate limit. Thus the wing tip device 4 is moveable to a ground configuration for use when the aircraft is on the ground.

In the ground configuration 4b the wing tip device 4 is folded, from the above-mentioned flight configuration, such that the wing tip device 4 rotates rearwards (aft), sweeping in an arc. When the wing tip device 4 is in the ground configuration, the span of the wing 1 is reduced (as compared to when the wing tip device 4 is in the flight configuration) and the aircraft 2 thus complies with the above-mentioned airport clearances etc. In this regard, in the ground configuration the span may be reduced such that the span (with the wing tip device in the ground configuration) is less than, or substantially equal to, the airport compatibility gate limit.

When the wing tip device 4 is in the ground configuration, the aircraft 2 incorporating the wing 1 is unsuitable for flight. In this regard, the wing tip device 4 is aerodynamically and structurally unsuitable for flight in the ground configuration. The aircraft 2 is configured such that, during flight, the wing tip device 4 is not moveable to the ground configuration. The aircraft 2 comprises a sensor for sensing when the aircraft 2 is in flight. When the sensor senses that the aircraft 2 is in flight, a control system is arranged to disable the possibility of moving the wing tip device 4 to the ground configuration.

The wing tip device 4 and the fixed wing 3 are separated along an oblique cut plane passing through the upper and lower surfaces of the wing, the oblique cut plane being orientated normal to the rotational axis B (see below). The oblique plane and the rotational axis B is such that the fixed wing 3 and the wing tip device 4 do not clash when rotating between the flight and ground configurations. An example of a wing tip device 4 that is rotatable in this manner is shown in WO 2015/150835.

Figure 2:
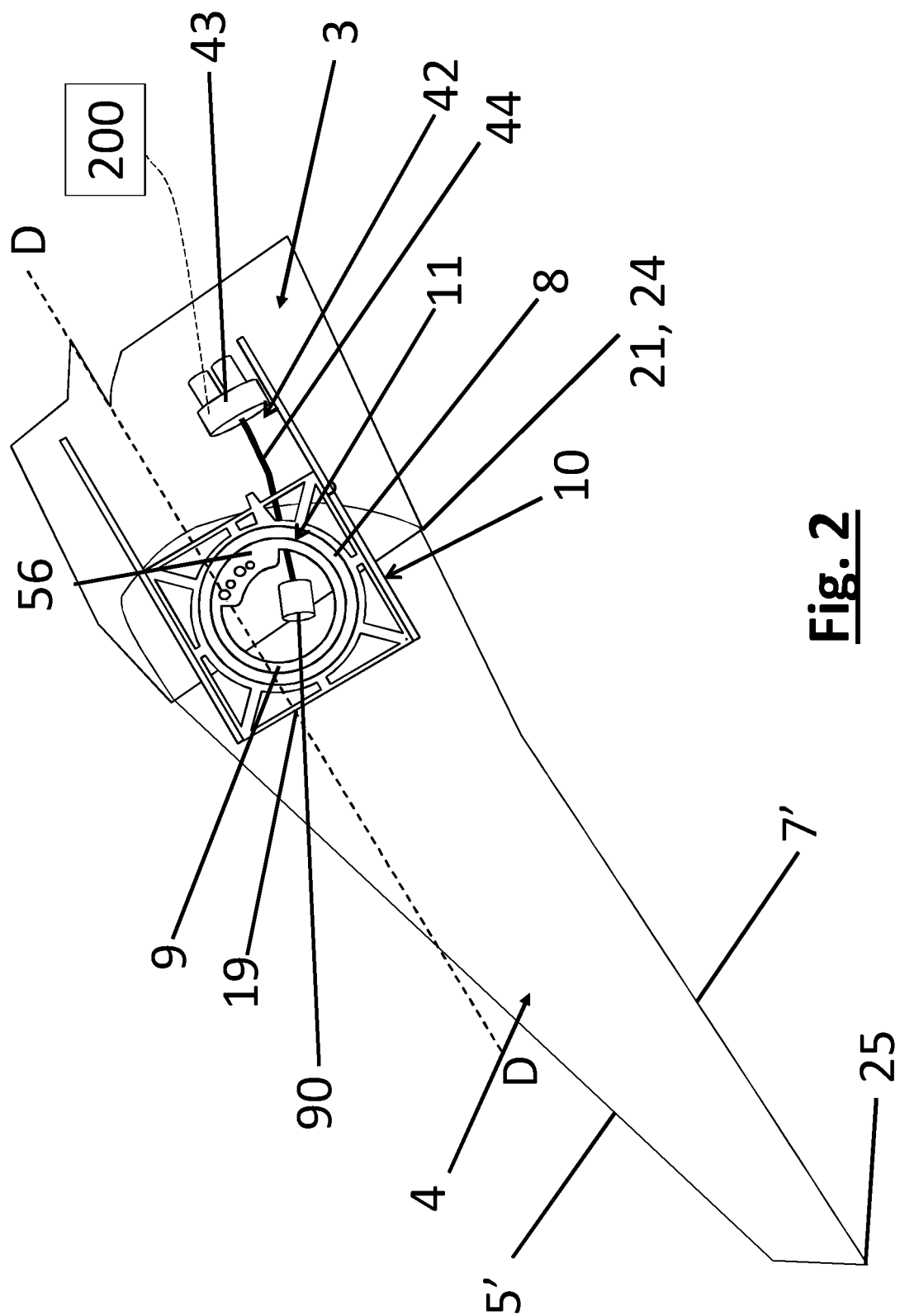
FIG. 2 shows a plan view of an end region of the wing of FIG. 1a, when the wing tip device is in the flight configuration, showing a rotational joint of the aircraft wing, where a locking pin, alignment pin and parts of a rotation mechanism and locking mechanism of the rotational joint are omitted for illustrative purposes and where parts of the wing skin of the wing tip device and of the fixed wing are shown in phantom so that the rotational joint can be seen.

Referring to FIG. 2, the aircraft 2 comprises a rotational joint 10. The rotational joint 10 comprises a rotation mechanism 11 that rotatably couples the wing tip device 4 to the fixed wing 3, to allow the wing tip device 4 to rotate between the flight and ground configurations 4a, 4b.

The aircraft 2 is arranged such that substantially all the aerodynamic and inertial loads on the wing tip device 4 during use of the aircraft, are transferred to the fixed wing 3, via the rotational joint 10.

The rotation mechanism 11 is in the form of a slew ring, comprising an outer race 8 and an inner race 9. Each of the inner and outer races 9, 8 are substantially circular rings. The inner race 9 is concentrically mounted within the outer race 8 and arranged to rotate within the outer race 8.

The outer race 8 is mounted to the fixed wing 3 such that the outer race 8 is rotationally fixed relative to the fixed wing 3. The outer race 8 is also attached to the outboard rib 31 of the fixed wing 3 (see FIG. 5).

The inner race 9 is nested within the outer race 8 and is concentric with the outer race 8. In this regard, the outer race 8 and the inner race 9 are both centred on a common central axis B.

The inner race 9 is arranged to rotate about the common central axis B. The inner race 9 has a 'V-shaped' radially outer surface that bears against a complementary 'V-shaped' radially inner surface of the outer race 8 such that the inner race 9 acts a follower and the outer race 8 acts as a guide, to guide the rotation of the inner race 9.

The inner race 9 is rotationally fixed relative to the wing tip device 4 such that the wing tip device 4 rotates with the inner race 9, between the flight and ground configurations, about the rotational axis B. In this regard, the inner race 9 is attached to the inboard rib 34 of the wing tip device 4.

Figure 5:
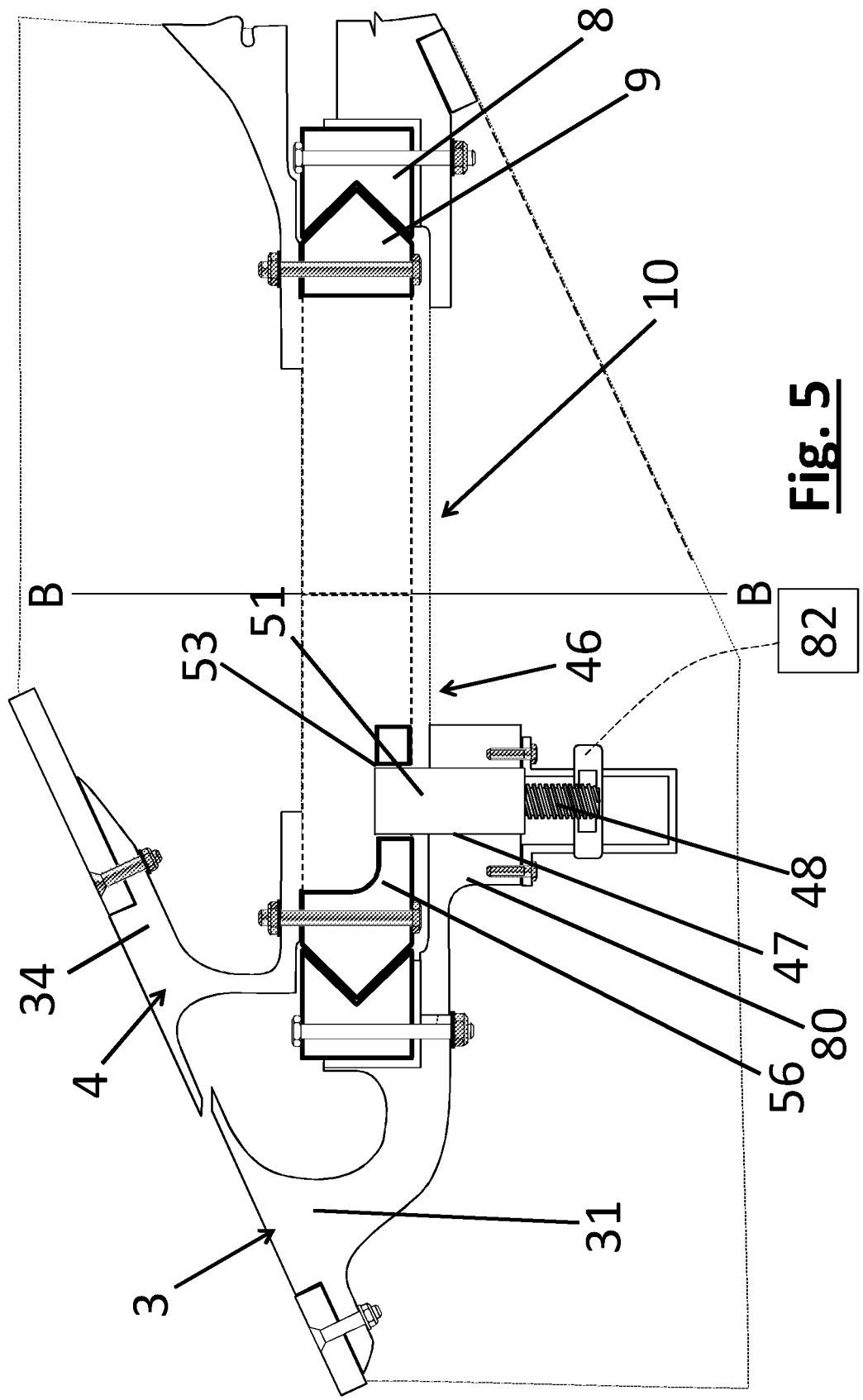
FIG. 5 is a cross-sectional view of adjacent portions of the fixed wing and wing tip device, where the wing tip device is locked in the flight configuration, taken along the line D-D in FIG. 2.

A rotational drive member in the form of a drive shaft 70 is located radially inwardly of the inner race 9 (the drive shaft 70 is omitted from FIGS. 2 and 5 for illustrative purposes but is shown in FIGS. 3 and 4). The drive shaft 70 has a central longitudinal axis C (see FIG. 3) that is co-axial with the rotational axis B. The drive shaft 70 is arranged to rotate about its rotational axis C.

The drive shaft 70 is connected to an electric motor 43 (see FIG. 2) via an epi-cyclic (planetary) transmission 90 (see FIG. 6). In this respect, the electric motor 43 rotatably drives an input shaft 44. The transmission 90 couples the input shaft 44 to the drive shaft 70, which may be regarded as forming an output shaft.

The transmission 90 is a reduction transmission. In this regard, the transmission 90 is configured to convert a high speed low torque input, from the electric motor 43, into a low speed high torque (it will be appreciated that the terms 'high' and 'low' are being used relative to each other). The transmission 90 has an input to output gear ratio of 400:1. The motor 43, input shaft 44, transmission 90 and drive shaft 70 together form a 'geared rotary actuator' 42.

The drive shaft 70 is coupled to the inner race 9, by pairs of pinned lug joints 71 distributed in the circumferential direction about the rotational axis B (see FIGS. 3 and 4), such that the rotation of the drive shaft 70 rotates the inner race 9.

Since the inner race 9 is fixed to the inboard rib 34 of the wing tip device 4, this in turn rotates the wing tip device 4 between the flight and ground configurations, about the rotational axis B. The geared rotatory actuator 42 is arranged to rotate the inner race 9 in both rotational directions about the axis B, so as to rotate the wing tip device 4 from the flight configuration to the ground configuration and from the ground configuration to the flight configuration.

The rotational joint 10 further comprises a locking mechanism assembly 46 configured to selectively lock the rotation mechanism 11 such that the wing tip device 4 is locked in the flight configuration or the ground configuration.

Referring to FIGS. 2 to 7f, the locking mechanism assembly 46 comprises a locking pin 51 that is mounted to the fixed wing 3, for reciprocal movement between an extended and retracted position. The locking mechanism assembly 46 further comprises first and second locking bores 53, 54 provided in an arcuate flange 56 on a radially inner surface of the inner race 9. These each receive the locking pin 51 so as to prevent relative rotation of the inner and outer races 9, 8, to lock the wing tip device 4 in its flight or ground configurations respectively.

In this regard, the locking pin 51 and the first locking bore 53 form part of a first locking mechanism, to lock the wing tip device 4 in the flight configuration and the locking pin 51 and the second locking bore 54 form part of a second locking mechanism, to lock the wing tip device 4 in the ground configuration.

The arcuate flange 56 protrudes radially inwardly from the radially inner surface of the inner race 9 and extends in the circumferential direction, part way around the rotational axis B.

The first and second locking bores 53, 54 have an identical size and shape. Only the first locking bore 53 is shown in FIGS. 7a to 7f, but it will be appreciated that the description of the first locking bore 53 applies correspondingly to the second locking bore 54.

The first locking bore 53 is defined by a respective internal surface 104 of the flange 56. The first locking bore 53 is elongate and extends from a first end 73 to a second end 74 along a central longitudinal axis I. The first end 73 is open and first receives the locking pin 51 as the locking pin 51 is moved from its retracted position to its extended position. The first locking bore 53 is substantially cylindrical. In this regard, it has a circular cross-sectional shape that has a constant diameter along its length.

Referring to FIGS. 3 and 4, the first and second locking bores 53, 54, are distributed in the circumferential direction, relative to the rotational axis B. The order of the locking bores 53, 54 in the clockwise direction, about the rotational axis B, when viewed looking from above the rotational joint 10 (as in FIGS. 3 and 4), is the first locking bore 53 then the second locking bore 54.

The first and second locking bores 53, 54 are located at the same radius from the rotational axis B and offset from each other in the circumferential direction by a pitch angle P (see FIG. 4) that is equal to the angle that the wing tip device 4 rotates through, about the axis B, as it rotates from its flight configuration to its ground configuration and vice versa.

The arcuate flange 56 is rotationally fixed relative to the inner race 9 (it is integrally formed with the inner race 9), such that it rotates with the inner race 9. Accordingly as the inner race 9 rotates, as the wing tip device 4 rotates between the flight configuration and the ground configuration, the first and second locking bores 53, 54 also rotate about the rotational axis B, i.e. along a second direction, which is an arc D2 (see FIG. 3). The first direction D1 is discussed below in relation to the alignment mechanism.

Since the inner race 9 is rotationally fixed relative to the wing tip device 4, as the wing tip device 4 is rotated from the flight to the ground configuration the inner race 9 rotates about the rotational axis B, anticlockwise in the orientation shown in FIGS. 3 and 4, by the pitch angle P. Similarly, as the wing tip device 4 rotates from the ground configuration to the flight configuration the inner race 9 rotates clockwise about the rotational axis B by the pitch angle P.

Since the pitch angle P is equal to the angle that the wing tip device 4 rotates through, and the first and second locking bores 53, 54 are offset from each other by the pitch angle P, when the wing tip device 4 is in the ground configuration the second locking bore 54 is in the general position that the first locking bore 53 was in in the flight configuration, and vice versa (although due to tolerances and elasticity in the rotational joint and/or rotary actuator 42, the angle that is actually rotated through may be greater than, or less than, the pitch angle P, as discussed in further detail below).

Figure 7A:
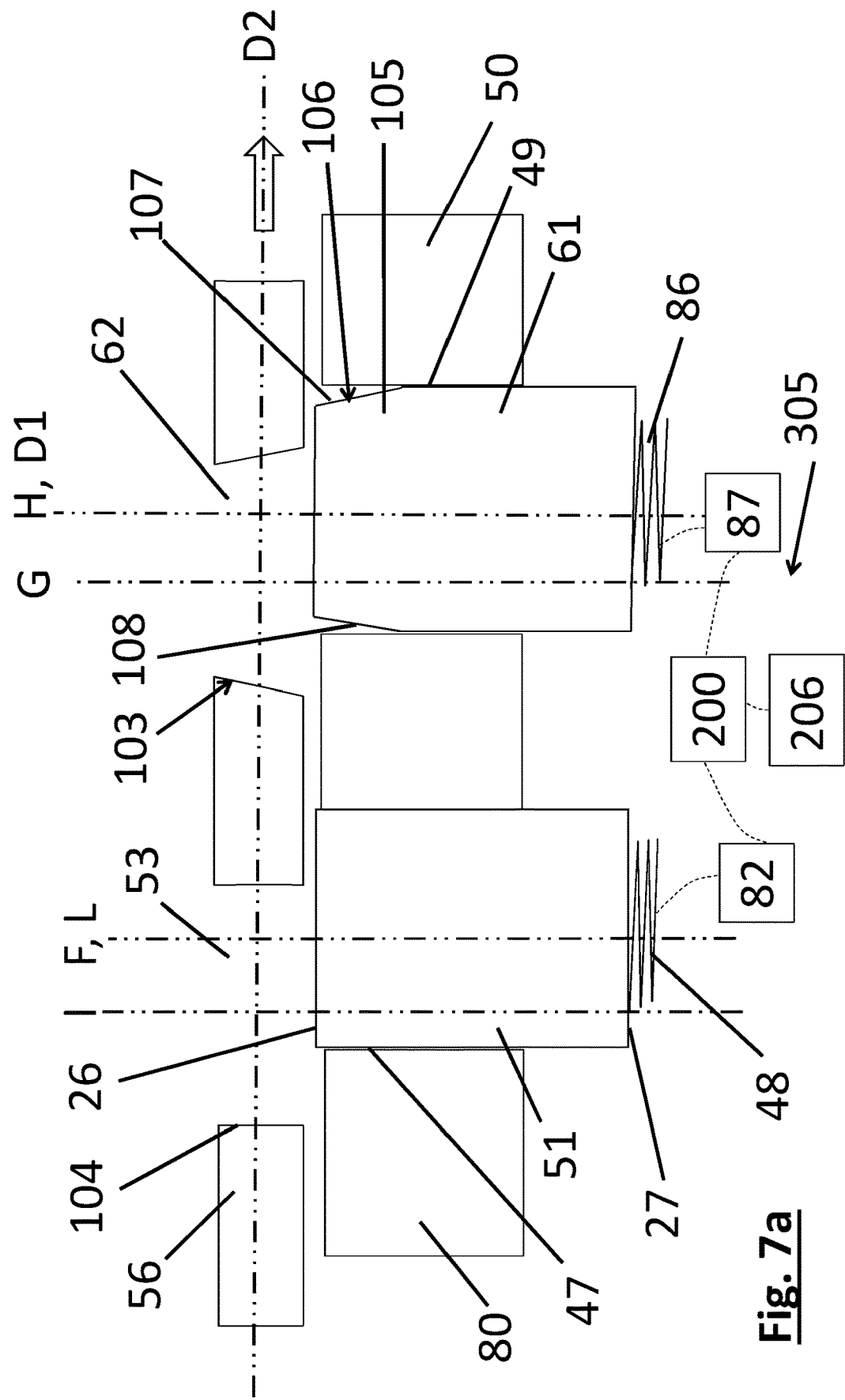

The locking pin 51 is slidably mounted in a cylindrical bore 47, in a bore housing 80 that is integrally formed with the outboard rib 31 of the fixed wing 3, for reciprocal movement between a retracted position (as shown in FIG. 7a) and an extended position (as shown in FIGS. 7e and 7f) along a locking direction L.

The locking pin 51 extends from a first end 26 to a second end 27, along a central longitudinal axis F. The locking pin 51 is cylindrical (a solid cylinder). The locking direction L is substantially co-axial with the longitudinal axis F of the locking pin 51. The locking pin 51 is not tapered. In this regard, the locking pin has a substantially constant width along its length. In this regard, the section of the locking pin 51 that is received in a locking bore 53, 54, to lock the wing tip device 4 in the flight or ground configuration, is not tapered.

When the locking pin 51 is in its extended position, it protrudes out of the open end of the cylindrical bore 47 in the fixed wing 3 and into one of the first or second locking bores 53, 54 in the flange 56, in dependence on the rotational position of the inner race 9 (described in more detail below) to lock the wing tip device 4 in the flight or ground configuration. The locking pin 51 passes all the way through the bore 53, 54, until its end is flush with the second end 74 of the bore 53, 54.

When the locking pin 51 is in its retracted position, it is located within the bore 47 in the fixed wing 3 such that the locking pin 51 does not extend into the respective locking bore 53, 54. In this position, the wing tip device 4 is unlocked and is able to rotate relative to the fixed wing 3, between the flight and ground configurations.

The locking mechanism further comprises a locking pin actuator (48, 82) coupled to the locking pin 51 to actuate the locking pin 51 from its retracted position to its extended position, and vice-versa.

Figure 7B:
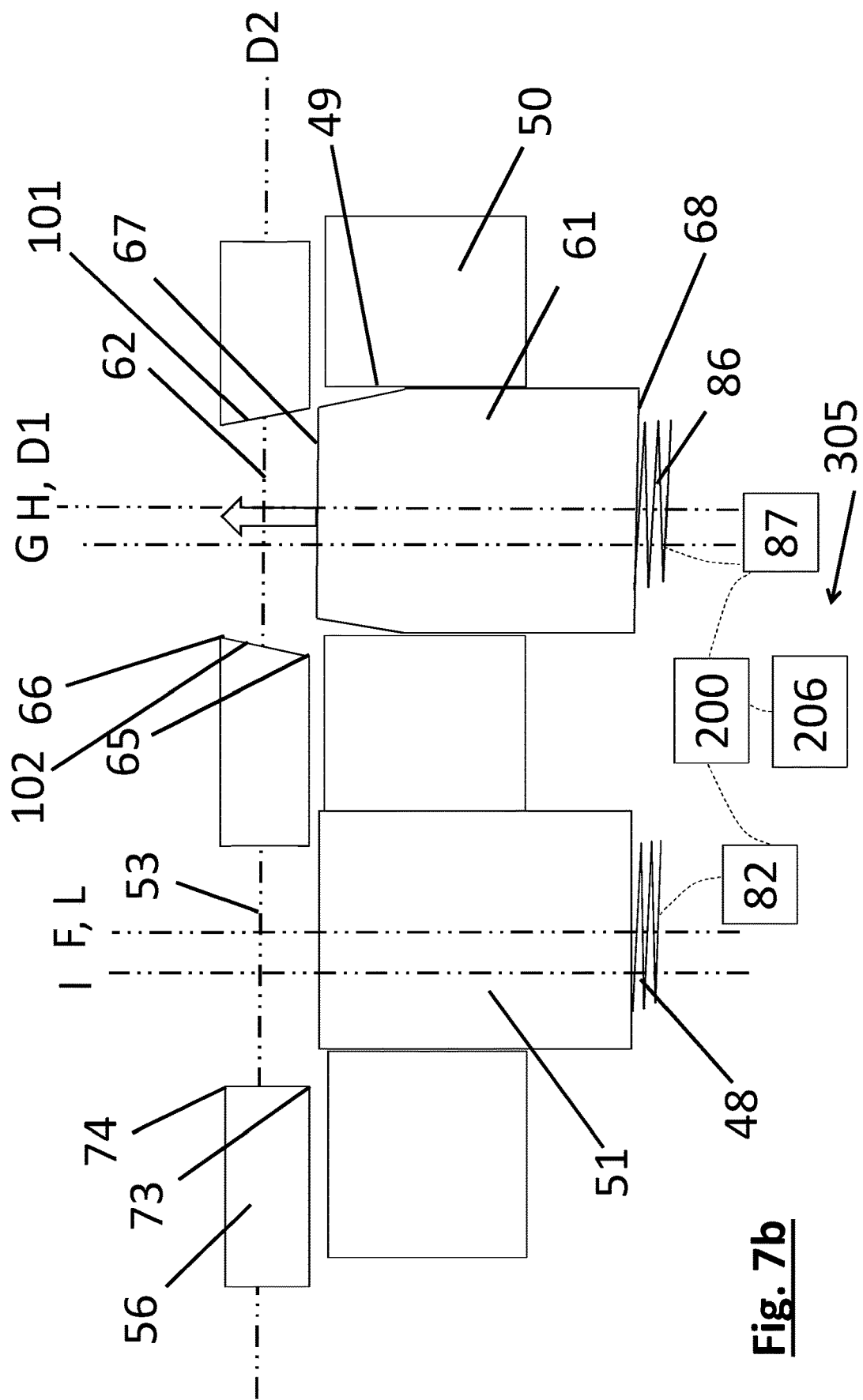

In the currently described embodiment the locking pin actuator (48, 82) comprises a coiled spring 48 and a solenoid 82 (shown schematically in FIGS. 7a and 7b). When the locking pin 51 is in its retracted position, the coiled spring 48 is compressed and acts to urge the locking pin 51 into its extended position.

The solenoid 82 is arranged with the locking pin 51 such that when the solenoid 82 is energised, it retains the locking pin 51 in its retracted position (against the force of the spring 48) or if the locking pin 51 is in its extended position, it moves the locking pin 51 backwards along the locking direction L to its retracted position. When the solenoid 82 is de-energised, the spring 48 moves the locking pin 51 forwards along the locking direction L, towards its extended position. It will be appreciated that the solenoid 82 is shown schematically, with features of the solenoid such as the arrangement of a solenoid coil and an armature, attached to the locking pin 51, that is moved by the solenoid coil are not shown. Such features of a solenoid are well known in the art and so will not be described in any further detail.

When the locking pin 51 is aligned with the first or second locking bore 53, 54, the locking pin 51 is receivable in the locking bore 53, 54 by the actuation of the locking pin actuator (48, 82). In this position, the locking bore 53, 54 is aligned with the locking pin 51 along the locking direction L. In this regard, the locking bore 53, 54 and the locking pin 51 are at corresponding positions in the second direction D2 (i.e. aligned along the locking direction L), with the longitudinal axis I of the locking bore 53, 54 and the longitudinal axis F of the locking pin 51 positioned such that they are co-axial with each other (see FIGS. 7d to 7f).

Each locking bore 53, 54 has a diameter that closely matches the diameter of the locking pin 51 such that when they are aligned, and the locking pin 51 is actuated into the locking bore 53, 54 the locking pin 51 forms a close-fit with the locking bore 53, 54. In this respect, when the locking pin 51 and locking bore 53, 54 misaligned (in the second direction D2), the locking pin 51 is not receivable in the locking bore 53, 54 because the locking pin 51 abuts against the under surface of the arcuate flange 56.

The rotational joint 10 further comprises an alignment mechanism assembly that comprises an alignment pin 61 (see FIG. 7a) and first and second alignment bores 62, 63 (see FIG. 3) for receiving the alignment pin 61, so as to align the locking pin 51 with the first or second locking bores 53, 54 respectively.

In this respect, the alignment pin 61 and the first alignment bore 62 form part of a first alignment mechanism, for aligning the first locking bore 53 with the locking pin 51. Similarly, the alignment pin 61 and the second alignment bore 63 form part of a second alignment mechanism, for aligning the second locking bore 54 with the locking pin 51.

The first and second alignment bores 62, 63 (see FIGS. 3 and 4) are provided in the arcuate flange 56 and are each defined by a respective internal surface 103 that defines the bore (see FIG. 7a). Each of the alignment bores 62, 63 are identical. Only the first alignment bore 62 is shown in FIGS. 7a to 7f, but it will be appreciated that the description of the first alignment bore 62 applies correspondingly to the second alignment bore 63.

With reference to FIGS. 7a to 7f, the first alignment bore 62 extends from a first end 65 to a second end 66 along a central longitudinal axis G (see FIG. 7b). The first end 65 first receives a first end 67 of the alignment pin 61 when the alignment pin 61 is moved from an initial position (shown in FIGS. 7a and 7b) to an end position shown in FIGS. 7d and 7e).

When the alignment pin 61 is in its initial position, it is in a retracted position in which the alignment pin 61 is not received in the alignment bore 62. When the alignment pin 61 is in its end position in the first alignment bore, it is received in the alignment bore 62 such that the first locking bore 53 is aligned with the first locking pin 51 (discussed in more detail below). Similarly when the alignment pin 61 is in its end position in the second alignment bore 63, the second locking bore 54 is aligned with the first locking pin 51.

The first end 65 of the alignment bore 62 is proximal the first end 67 of the alignment pin 61 when the alignment pin is in its initial position and the second end 66 of the alignment bore 62 is proximal the first end 67 of the alignment pin 61 when the alignment pin 61 is in its end position.

Each alignment bore 62, 63 is tapered such that it has the shape of a truncated right circular cone (where an upper portion of cone, that includes the apex, is removed). In this regard, each alignment bore 62, 63 is frusto-conical. Each alignment bore 62, 63 has the shape of a right frustum of a cone. Each alignment bore 62, 63 is axisymmetric about its longitudinal axis.

Each alignment bore 62, 63 is tapered such that the cross-sectional area of the bore 62, 63 increases from its second end 66 to its first end 65. The diameter of the second end 66 of each alignment bore 62, 63 is substantially the same as the diameter of the first end 67 of the alignment pin 61. Therefore, when the first end 67 of the alignment pin 61 is positioned at the second end 66 of the alignment bore 62, when the alignment pin 61 is in its end position, the alignment pin 61 forms a close-fit within the alignment bore 62. The diameter of the first end 65 of the alignment bore 62 is greater than the diameter of the first end 67 of the alignment pin 61.

Each alignment bore 62, 63 comprises first and second sides 101, 102 that are diametrically opposed halves of the truncated cone (relative to the longitudinal axis G of the alignment bore). In this regard, each of the first and second sides 101, 102 are opposed in the second direction D2 (see FIG. 7b). It will be appreciated that these 'sides' 101, 102 of the bore 62, 63 are respective portions of the internal surface 103 of the flange 56 (i.e. sides that define the bore 62, 63).

Referring to FIGS. 3 and 4, the first alignment bore 62 is located adjacent to the first locking bore 53 and the second alignment bore 63 is located adjacent to the second locking bore 54 (adjacent in the circumferential direction). The first and second alignment bores 62, 63 are located at the same radius from the rotational axis B and offset from each other in the circumferential direction by the pitch angle P The arcuate flange 56 couples the locking bores 53, 54 and alignment bores 62, 63 together such that, as the wing tip device 4 rotates between the flight and ground configurations, the first alignment bore 62 rotates with the first locking bore 53 and the second alignment bore 63 rotates with the second locking bore 54, about the rotational axis B, i.e. about a common rotational axis.

The locking bores 53, 54 rotate relative to the locking pin 51 about a common rotational axis, which is the rotational axis B, and the alignment bores 62, 63 rotate relative to the alignment pin 61 about the common rotational axis B. In this respect, all of the locking bores 53, 54 and the alignment bores 62, 63 are rotationally fixed relative to each other, about the common rotational axis B.

The alignment pin 61 is slidably mounted in a cylindrical bore 49, in a bore housing 50. The bore housing 50 is integrally formed with the outboard rib 31 of the fixed wing 3. The alignment pin 61 is slidably mounted in the cylindrical bore 49 for reciprocal movement between its initial position and end position along a first direction D1 (see FIG. 7a). The first direction D1 is co-axial with the longitudinal axis H of the alignment pin 61 (see below). The first direction D1 is parallel to the longitudinal axis G of the alignment bore 62, 63.

The alignment pin 61 has a circular cross-sectional shape and extends from its first end 67 to a second end 68, along a central longitudinal axis H. The alignment pin 61 has a tapered end section 105, located at the first end 67 of alignment pin 61 (i.e. extending from the first end 67).

The tapered section 105 has the shape of a truncated right circular cone (where an upper portion of cone, that includes the apex, is removed). In this regard, the tapered section 105 is frusto-conical. The tapered section 105 has the shape of a right frustum of a cone. The alignment pin 61, including the tapered section 105, is axisymmetric about its longitudinal axis.

Along the tapered section 105, the cross-sectional area of the alignment pin 61 increases with increasing distance from the first end 67 of the alignment pin 61 (towards the second end 68).

The tapered section 105 has an external surface 106 that comprises first and second sides 107, 108 that are diametrically opposite halves of the truncated cone (relative to the longitudinal axis H of the alignment pin 61). In this regard, each of the first and second sides 107, 108 are opposite each other in the second direction D2 (see FIG. 7a) and face away from each other.

The alignment mechanism further comprises an alignment pin actuator (86, 87) coupled to the alignment pin 61 to actuate the alignment pin 61 from its initial position to its end position, and vice-versa. In the currently described embodiment, the alignment pin actuator (86, 87) comprises a coiled spring 86 and a solenoid 87 (shown schematically in FIGS. 7a and 7b). When the alignment pin 61 is in its initial position, the coiled spring 86 is compressed and acts to urge the alignment pin 61 into its end position.

The solenoid 87 is arranged with the alignment pin 61 such that when the solenoid 87 is energised, it retains the alignment pin 61 in its initial position (against the force of the spring 86) or if the alignment pin 61 is in its end position, it moves the alignment pin 61 backwards along the first direction D1 to its initial position. When the solenoid 87 is de-energised, the spring 86 moves the alignment pin 61 forwards along the first direction D1, towards its end position. It will be appreciated that the solenoid 87 is shown schematically, with features of the solenoid such as the arrangement of a solenoid coil and an armature, attached to the alignment pin 61, that is moved by the solenoid coil are not shown. Such features of a solenoid are well known in the art and so will not be described in any further detail.

Due to tolerances and elasticity in the rotational joint 10 and the geared rotary actuator 42, after the geared rotary actuator 42 has been rotated by an amount such that the wing tip device 4 is in the flight or ground configuration, and the respective locking bore 53, 54 and locking pin 51 should be aligned, the locking pin 51 may actually be misaligned with the locking bore 53, 54.

The alignment pin 61 and first alignment bore 62 are tapered such that the engagement of the alignment pin 61 in the alignment bore 62 acts to guide the locking pin 51 and the first locking bore 53 into alignment (i.e. to align the locking pin 51 and locking bore 53).

In this regard, if the locking pin 51 is not aligned with the locking bore then when the alignment pin 61 is received in the first alignment bore 62, one of the inclined sides 107, 108 of the alignment pin 61 forms a sliding contact with one of the inclined sides 101, 102 of the alignment bore 62 (depending on whether the locking bore 53 is in an under travel or over travel position, in the second direction, relative to the locking pin 51). As the alignment pin 61 is moved towards its end position in the alignment bore 62, the sliding contact between the inclined sides of the alignment pin and alignment bore acts to guide the alignment bore 62 in the second direction D2. This acts to guide the locking bore 53 in the second direction D2, due to the coupling of the alignment bore 62 and locking bore 53 by the flange 56.

It will be appreciated that, similarly, the alignment pin 61 and second alignment bore 63 are tapered such that the engagement of the alignment pin 61 in the second alignment bore 63 acts to guide the second locking bore 54 into alignment with the locking pin 51.

The alignment pin 61 and each alignment bore 62, 63 has a taper that is large enough that the alignment pin 61 does not get jammed in its end position in the alignment bore 62, 63 and can be removed with a relatively low force. This is advantageous in that the alignment pin actuator (86, 87) only has to exert a relatively low force on the alignment pin 61, to remove it from its end position in the alignment bore 62, 63, which allows the alignment pin actuator (86, 87) to be relatively small. Furthermore, if the alignment pin actuator (86, 87) fails, this allows the alignment pin 61 to be removed from its end position in the alignment bore 62, 63 with a relatively small force, for example by hand and without the need for specialist tooling.

In the currently described embodiment the alignment pin 61 has a taper angle Ø (see FIG. 7f) of 10° and the alignment bore 62 has a taper angle Ψ (see FIG. 7f) of 10°.

The alignment pin 61 and alignment bore 62 may each have a taper angle of greater than or equal to 3° and preferably greater than or equal to 7° to provide the function that the alignment pin 61 does not get jammed in its end position in the alignment bore 62, 63. Preferably the alignment pin and/or the alignment bore has a taper angle that is less than or equal to 45°, more preferably less than or equal to 30°, still more preferably less than or equal to 20°.

The taper angle Ø of the alignment pin 61 is the angle that the inclined surface 107, 108 of the alignment pin 61, that defines the taper, is inclined relative to the longitudinal axis H of the alignment pin 61, i.e. the angle that the inclined surface 107, 108 is rotated relative to the longitudinal axis H of the alignment pin (in a radial plane at that local circumferential position about the longitudinal axis H). In this respect, the taper angle is the half angle of the cone that would formed by the tapered section 105 of the alignment pin 61 (if it was not truncated).

The taper angle Ψ of the alignment bore 62 is the angle that the inclined side 101, 102 of the bore 62, that defines the taper, is inclined relative to the longitudinal axis G of the alignment bore 62, i.e. the angle that the inclined surface 101, 102 is rotated relative to the longitudinal axis G of the alignment bore (in a radial plane at that local circumferential position about the longitudinal axis G). In this respect, the taper angle is the half angle of the cone that would formed by the alignment bore 62 (if it was not truncated).

It will be appreciated that the alignment bore 62 and tapered section 105 of the alignment pin 61 have substantially the same shape. The tapered section 105 of alignment pin 61 forms a close-fit with the alignment bore 62 when it is in its end position.

The aircraft 2 comprises a control system 305 (shown schematically in FIGS. 7a and 7b). The control system 305 comprises a control unit 200, the geared rotary actuator 42 (omitted from FIGS. 7a and 7b for illustrative purposes), the solenoids 82, 87 and an operator input device 206. The operator input device 206 is configured to receive an input from a human operator, as to whether the wing tip device is to be locked in the flight or ground configuration. In the currently described embodiment the operator input device is a control switch located in the aircraft cockpit. However, it will be appreciated that any suitable input device may be used and it may be located at alternative positions inside or outside the aircraft. Furthermore, it will be appreciated that an automatic system may be used where no operator input device 206 is required, for example where aircraft sensors detect that the aircraft has landed and come to a stop on the runway, the wing tip device may be moved from the flight configuration to the ground configuration. The control system 305, including the solenoids 82, 87 and the operator input device 206, are omitted from FIGS. 7c to 7f for illustrative purposes.

The control unit 200 is connected to the motor 43 (of the geared rotary actuator 42) and to the solenoids 82, 87, to control their operation, to lock the wing tip device in the flight or ground configuration, as selected via the operator input device 206, in line with the methods of locking and unlocking described below (the connection of the control unit 200 to the geared rotary actuator 42 is omitted from the Figures for illustrative purposes). In the currently described embodiment the control unit 200 is a computer programmed with software. Alternatively, the control unit 200 may be computer hardware that is hardwired to provide the function of the control system without any programmable software, for example.

A method of changing the configuration of the wing tip device 4, from the ground configuration to the flight configuration, will now be described with reference to FIGS. 7a to 7f, as well as the flow chart in FIG. 8, which sequentially show the steps of the method. It will be appreciated that this method comprises a method of locking the wing tip device 4 in the flight configuration.

Referring to FIG. 4, the rotation mechanism 11 is shown in a rotational position in which the wing tip device 4 is locked in the ground configuration 4b. When the wing tip device 4 is locked in the ground configuration 4b, the locking pin 51 is received in the second locking bore 54. The receipt of the locking pin 51 in the second locking bore 54 rotatably fixes the inner race 9 relative to the fixed wing 3. Since the outer race 8 is rotationally fixed relative to the fixed wing 3, this rotationally fixes the inner race 9 relative to the outer race 8, i.e. it rotatably locks the rotation mechanism 11. The fixing of the inner race 9 in this rotational position rotationally fixes the wing tip device 4 in the ground configuration, i.e. it locks the wing tip device 4 in the ground configuration 4b.

In order to change the wing tip device from the ground configuration to the flight configuration, a 'flight configuration' setting is selected on the operator input device 206. The operator input device 206 then sends a 'flight configuration' signal to the control unit 200.

Figure 8:
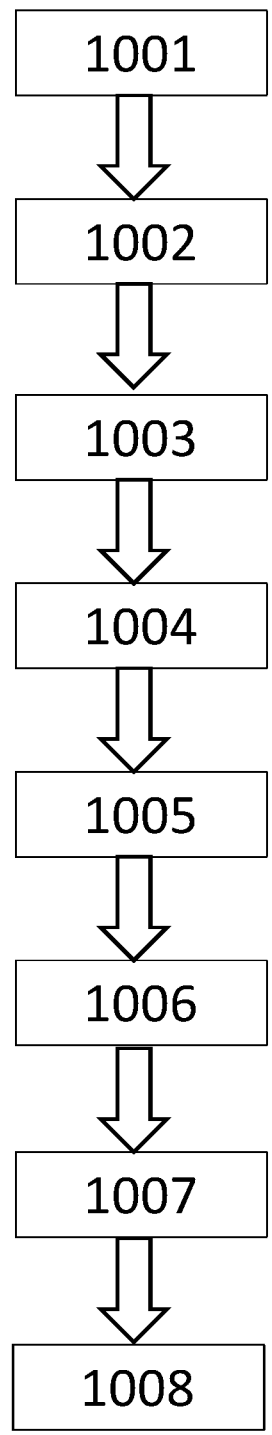
FIG. 8 is a flowchart of the sequence of steps of moving the wing tip device of the aircraft of FIGS. 7a to 7f from the ground configuration to the flight configuration and locking the wing tip device in the flight configuration.

This causes the control unit 200 to output a command signal to the solenoid 82 to cause the solenoid 82 to be energised to move the locking pin 51 from its extended position to its retracted position, out of the second locking bore 54 (step 1001 of FIG. 8).

The control unit 200 then outputs a signal to the motor 43 (of the geared rotary actuator 42) to rotate the wing tip device 4 from the ground configuration to the flight configuration. In this respect, the motor 43 is operated to rotate the inner race 9 clockwise (when viewed from above the rotation mechanism 11, shown in FIGS. 3 and 4) about the rotational axis B by the pitch angle P (see FIGS. 7a and 7b and step 1002 in FIG. 8).

As the wing tip device 4 rotates from its ground configuration to its flight configuration, the first locking bore 53 moves clockwise, i.e. to the right in FIGS. 7a and 7b, in the direction of the arrow in the second direction D2.

However, due to said tolerances and elasticity in the rotational joint 10 and rotary actuator 42, when the wing tip device 4 reaches the position it should be in for the 'flight configuration', the locking pin 51 and the first locking bore 53 are misaligned, with the locking bore 53 in an under travel position, as shown in FIG. 7b, i.e. the first locking bore 53 is offset anti-clockwise relative to the locking pin 51 (to the left along the second direction D2 in FIG. 7b). In this respect, the longitudinal axis I of the first locking bore 53 is offset from the longitudinal axis F of the locking pin 51.

Due to the coupling of the first locking bore 53 and the first alignment bore 62 (the first locking bore 53 and the first alignment bore 62 are rotationally fixed relative to each other, by the arcuate flange 56), the first alignment bore 62 and the alignment pin 61 are correspondingly misaligned, by the same amount, with the first alignment bore 62 in an under travel position, i.e. the first alignment bore 62 is offset anti-clockwise relative to the alignment pin 61 (to the left along the second direction D2 in FIG. 7b). In this respect, the longitudinal axis G of the first alignment bore 62 is offset from the longitudinal axis H of the alignment pin 61.

In order to align the first locking bore 53 and the locking pin 51, the control unit 200 operates the alignment pin actuator (86, 87) to move the alignment pin 61 in the first direction D1 (step 1003 in FIG. 8). In this respect, the solenoid 87 is de-energised and the spring 86 moves the alignment pin 61 forwards along the first direction D1, from its initial position.

As the alignment pin 61 moves in the first direction D1, it comes into abutment with the first side 101 of the alignment bore 62. This abutment prevents further movement of the alignment pin 61 in the first direction D1 such that the alignment pin 61 is prevent from reaching its end position (see FIG. 7c and step 1004 of FIG. 8).

The control unit 200 then operates the motor 43 to continue the rotation of the inner race 9, and therefore the first alignment bore 62, in the same clockwise direction (i.e. to the right along the second direction D2 in FIG. 7c) (step 1005 of FIG. 8).

As the first alignment bore 62 moves in this second direction, the force exerted on the alignment pin 61 by the spring 86 causes the alignment pin 61 to slide along the first side 101 of the alignment bore 62 (which is moving in the second direction D2 as the alignment pin 61 moves in the first direction D1), until the alignment pin 61 reaches its end position in the alignment bore 62.

When the alignment pin 61 reaches its end position, it forms a close-fit in the alignment bore 62. This prevents further rotation of the inner race 9, which stalls the geared rotary actuator 42 (i.e. it stalls the motor 43).

When the alignment pin 61 reaches its end position, the locking bore 53 is positioned such that it is aligned with the locking pin 51 (see FIG. 7d and step 1006 in FIG. 8). In this regard, the longitudinal axes I, F of the locking bore 53 and locking pin 51 are co-axial.

The rotary actuator 42 (e.g. the motor 43) is also connected to the control unit 200 to provide an input to the control unit 200. If the rotary actuator 42 stalls, then this is detected by the control unit 200 which operates the solenoid 82, of the locking pin actuator, to de-energise it, so that the spring 48 moves the locking pin 51 forwards along the locking direction L from its retracted position to its extended position. When the locking pin 51 is in its extended position, it forms a close-fit within the locking bore 53 (see FIG. 7e and step 1007 in FIG. 8). The receipt of the locking pin 51 in the first locking bore 53 locks the wing tip device 4 in the flight configuration 4a.

The control unit 200 then operates the solenoid 87 to withdraw the alignment pin 61 from the alignment bore 62 to its initial position (see FIG. 7f and step 1008 in FIG. 8).

In the currently described embodiment, the tolerances and elasticity in the rotational joint 10 and rotary actuator 42 are low enough that, when the inner race 9 is rotated to its intended position for the flight configuration, the first alignment bore 62 is positioned with such accuracy that, if the alignment bore 62 is misaligned with the alignment pin 61, then this misalignment is such that when the alignment 61 is engaged in the alignment bore 62, it abuts against the first side 101 of the alignment bore 62, i.e. the leading side of the alignment bore 62 in the direction of travel of the alignment bore 62 (in the second direction D2).

Since, as described above, the alignment bore 62 is subsequently moved in the clockwise direction about rotational the axis B (i.e. to the right in FIG. 7a), so that the alignment pin 61 is guided to its end position, the first side 101 of the alignment bore 62 is the forward most side in that direction of rotation (i.e. in the direction of the local tangent to the direction of rotation) and so can be regarded as a 'leading side' of the alignment bore 62. It will be appreciated that the second side 102, i.e. the side opposite the leading side, can be regarded as the 'trailing side'.

Contacting the alignment pin 61 with the leading side 101 of the alignment bore 62 is advantageous in that the subsequent movement of the alignment bore 62, in said direction, acts to guide the alignment pin 61 to its end position. In contrast, if the alignment pin 61 first contacted the trailing side 102 then this may cause the alignment pin 61 to jam in the alignment bore 62 (i.e. before the alignment pin 61 reaches its end position), which would cause the rotation mechanism to jam in a position in which the first locking bore 53 is not aligned with the locking pin 51. This may also stall the rotary actuator 42. Therefore, it is desirable that the alignment pin 61 contacts the leading side of the alignment bore 62.

Figure 9A:
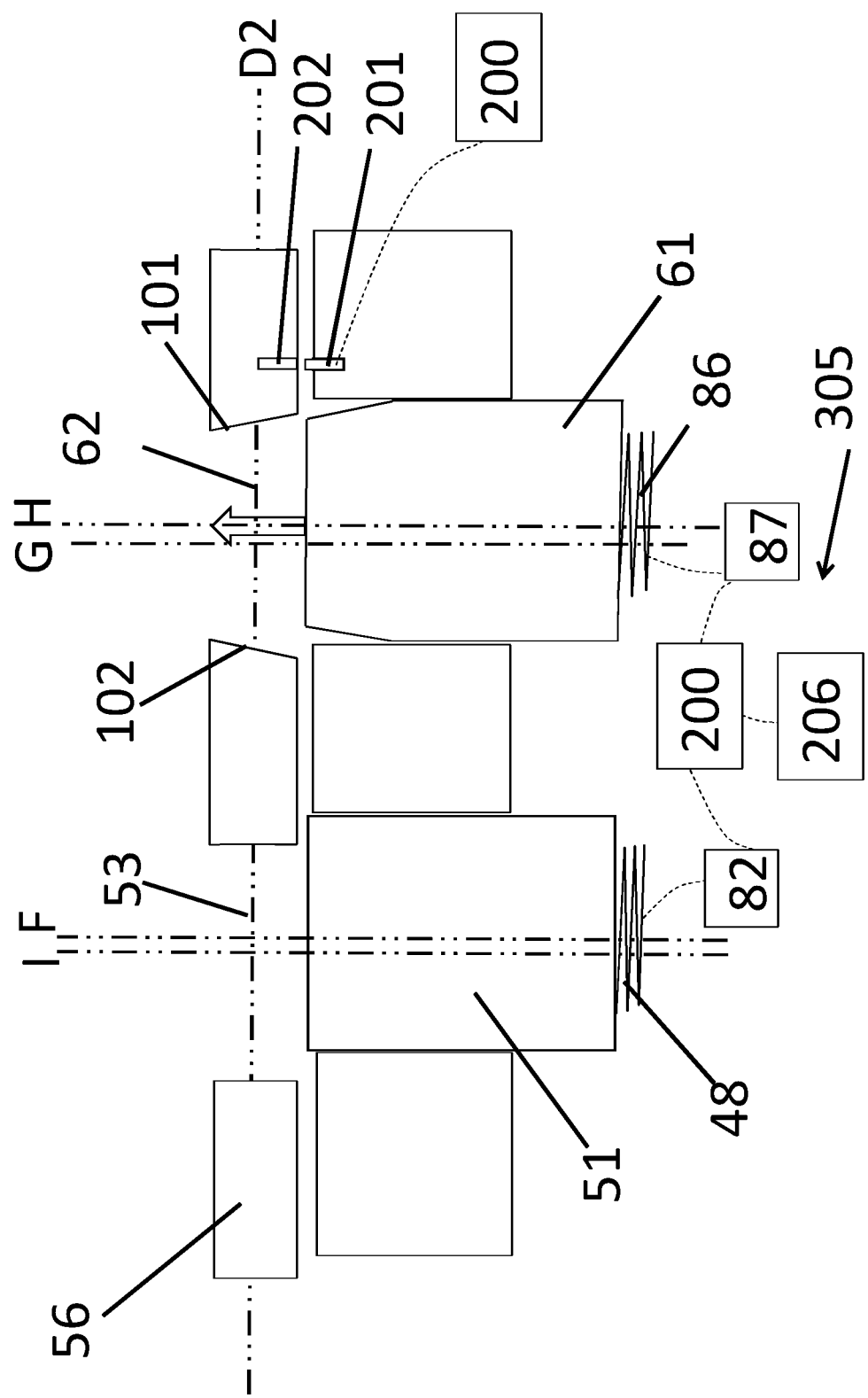

Referring to FIGS. 9a to 9c, there is shown a second embodiment of the invention. This embodiment of the invention is identical to the first embodiment, except for the differences described below. Corresponding features are given corresponding reference numerals.

This embodiment of the invention differs from the first embodiment of the invention in that a magnetic sensor 201 is fixedly attached to the bore housing 50 (mounted in a cavity in the bore housing 50), and a magnet 202 is fixedly attached to the arcuate flange 56 (mounted in a cavity in the flange 56), to rotate with the inner race 9. Accordingly as the wing tip device 4 rotates between the flight and ground configurations, the magnet 202 rotates relative to the magnetic sensor 201, about the rotational axis B. The magnetic sensor 201 and magnet 202 form part of the control system 305 and the magnetic sensor 201 is connected to an input of the control unit 200 (shown schematically in FIG. 9a). The control system 305, including the solenoids 82, 87 and the operator input device 206, are omitted from FIGS. 9b and 9c for illustrative purposes.

The control system 305 is arranged such that when the magnetic sensor 201 detects a position of the magnet 202 that signals that the first alignment bore 62 is positioned such that the alignment pin 61 will come into contact with the leading side (in this case the first side 101) of the alignment bore 62 (as the inner race rotates clockwise, as the wing tip device rotates from the ground configuration to the flight configuration), i.e. when the locking bore 53 and alignment bore 62 are in an under travel position, the control unit operates the solenoid 87 to move the alignment pin 61 in the first direction D1, from its initial position towards its end position. Accordingly, the alignment pin 61 then contacts the leading side 101 of the alignment bore 62.

As with the first embodiment, the alignment pin 61 then slides along the first side 101 of the alignment bore 62 to its end position, as the alignment bore 62 continues in the second direction D2, to align the locking bore 53 and locking pin 51. This stalls the rotary actuator 42, the locking pin 51 is then moved into the locking bore 53, to lock the wing tip device in the flight configuration, and the alignment pin 61 is then withdrawn from the alignment bore 62 (as in the first embodiment).

As with the first embodiment, contacting the alignment pin 61 with the leading side 101 of the alignment bore 62 is desirable, as compared to contacting it with the trailing side 102, as it avoids jamming of the rotation mechanism and allows the alignment pin 61 to be guided to its end position, thereby guiding the first locking bore 53 into alignment with the locking pin 51.

Alternatively, no sensor arrangement (201, 202) may be used, to ensure that the alignment pin 61 contacts the leading side 101 of the alignment bore 62. For example, the control system 305 may be based on timing, for example timing of the rotation of the wing tip device.

Figure 10A:
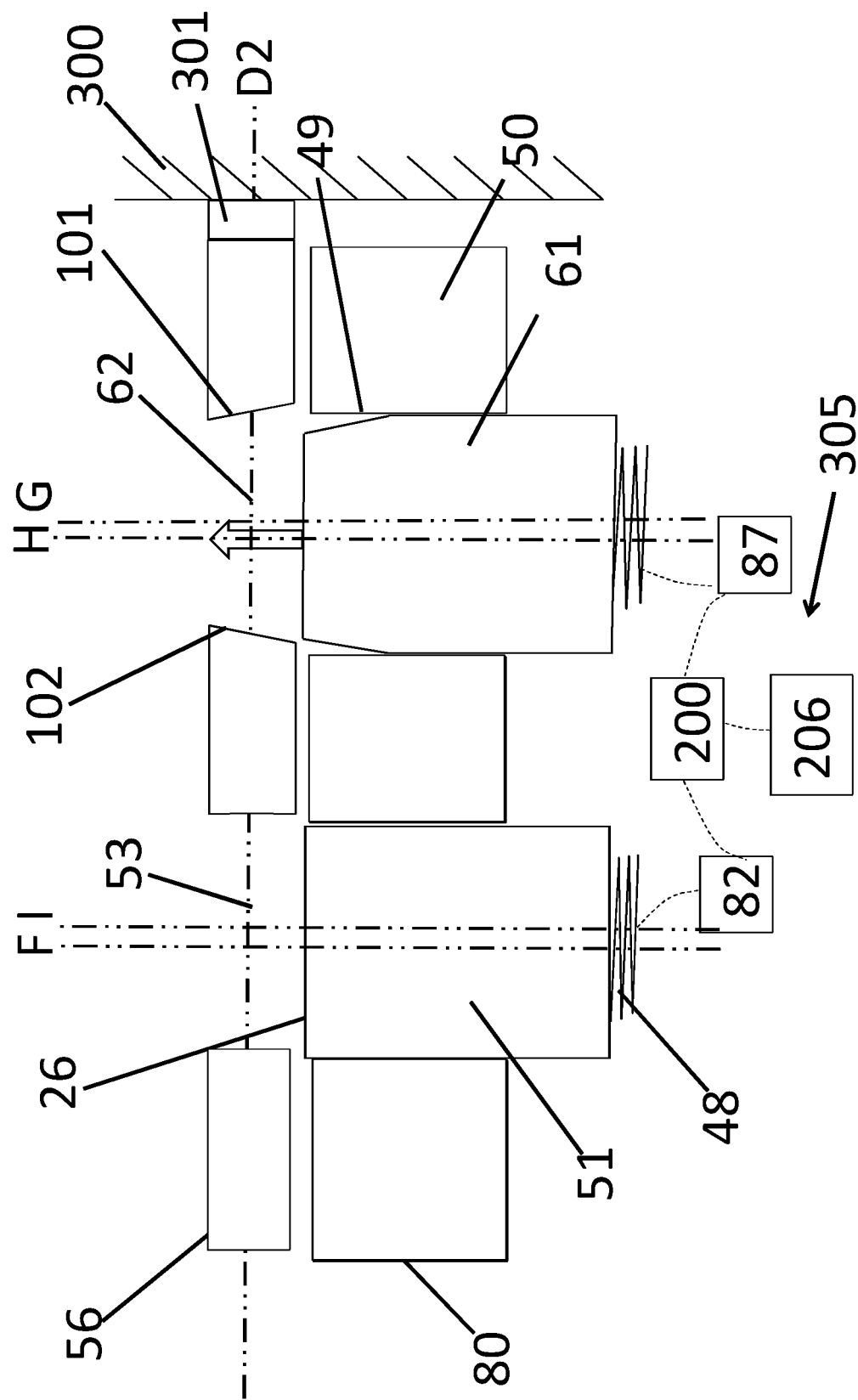

Referring to FIGS. 10a to 10c, there is shown a third embodiment of the invention. This embodiment of the invention is identical to the first embodiment, except for the differences described below. Corresponding features are given corresponding reference numerals.

This embodiment of the invention differs from the first embodiment in that a mechanical stop 300 is fixed to the outer race 8 (the mechanical stop 300 is fixed relative to the fixed wing 3) and an abutment 301 is fixed to the inner race 9, to rotate with the inner race 9 (the stop 300 and abutment 301 are shown schematically in FIGS. 10a to 10c). The stop 300 and abutment 301 form part of the control system 305. Parts of the control system 305, including the control unit 200, solenoids 82, 87 and the operator input device 206, are omitted from FIGS. 10b and 10c for illustrative purposes.

Figure 11:
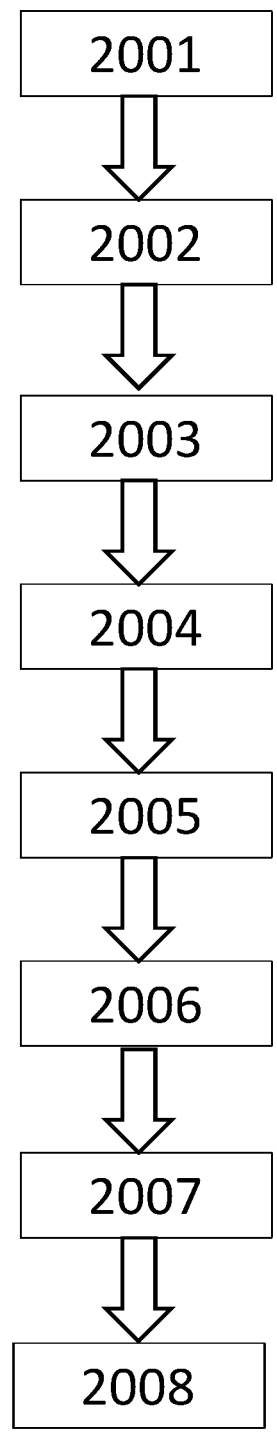
FIG. 11 is a flowchart of the sequence of steps of moving the wing tip device of the aircraft of FIGS. 10a to 10c from the ground configuration to the flight configuration and locking the wing tip device in the flight configuration.

With reference to the flow chart of FIG. 11, as with the first embodiment in order to move the wing tip device from the ground configuration to the flight configuration, the locking pin 51 is retracted from the second locking bore 54 (step 2001) and the inner race is rotated clockwise.

The stop 300 and abutment 301 are positioned such that when the geared rotary actuator 42 moves the wing tip device 4 to the flight configuration 4a, it rotates the inner race 9, about the rotational axis B, until the abutment 301 comes in contact with the stop 300. In this position, the contact of the abutment 301 and the stop 300 prevents any further rotation of the inner race 9 in that direction and the geared rotary actuator 42 stalls (step 2002).

In this position, the first alignment bore 62 is in an over travel position relative to the alignment pin 61 (see FIG. 10a), i.e. the first alignment bore 62 has been rotated clockwise passed its alignment position with the alignment pin 61 (i.e. to the right along the second direction D2 in FIG. 10a).

It will be appreciated that in the 'over-travel position', the alignment bore 62 has passed a position in which it is aligned with the alignment pin 61. In this regard, the alignment bore 62 has moved into alignment with the alignment pin 61, but continued to move out of alignment with the alignment pin 61 (when the alignment bore 62 is 'aligned' with the alignment pin 61, the longitudinal axis G of the alignment bore 62 is co-axial with the longitudinal axis H of the alignment pin 61). In this position, the first locking bore 53 is in a corresponding over travel position relative to the locking pin 51 (by the same amount).

The stall of the rotary actuator 42 is sensed by the control unit 200 which operates the solenoid 87 to move the alignment pin 61 in the first direction D1 (step 2003) into sliding contact with the second side 102 of the alignment bore 62. This abutment prevents further movement of the alignment pin 61 in the first direction D1 such that the alignment pin 61 is prevent from reaching its end position (see FIG. 10b and step 2004 in FIG. 11).

The control unit 200 then operates the motor 43 to reverse the direction of rotation of the inner race 9, and therefore the first alignment bore 62, i.e. to rotate the inner race 9 in the anti-clockwise direction (i.e. to the left along the second direction D2 in FIG. 10b) (step 2005). This may be done based on timing, for example the motor 43 is reversed a set period of time after the alignment pin 61 has been moved in the first direction D1. Alternatively, a sensor arrangement may be used to detect when the alignment pin 61 has jammed in the alignment bore 62.

As the first alignment bore 62 moves in this reverse direction, the alignment pin 61 slides along the second side 102 of the alignment bore 62 (which is moving in the second direction D2 as the alignment pin 61 moves in the first direction D1), until the alignment pin 61 reaches its end position (see FIG. 10c and step 2006 in FIG. 11). This aligns the locking pin 51 and the first locking bore 53.

As with the first embodiment, this stalls the rotary actuator 42 (also step 2006), the locking pin 51 is then received in the locking bore 53 (step 2007), to lock the wing tip device in the flight configuration, and the alignment pin 61 is then withdrawn from the locking bore 53 (step 2008).

Instead of, or in addition to, the mechanical stop 300 and abutment 301, the control system 305 may comprise a sensor configured to sense when the alignment bore is positioned, relative to the alignment pin, in the over-travel position. However, the mechanical stop and abutment arrangement is advantageous in that it provides a reliable system of accurately positioning the alignment bore in the over-travel position, and is not dependent on sensors.

Alternatively no sensor, or mechanical stop 300 or abutment 301, may be used where the control system is an open loop control system (such as in the first embodiment), for example based purely on the timing of the rotation of the wing tip device (or inner race). However, this would require that the tolerances and/or elasticity are relatively low, i.e. below a certain value.

Referring to FIGS. 12a and 12b there is shown a fourth embodiment of the invention. This embodiment of the invention is identical to the first embodiment of the invention, except for the differences described below. Corresponding features are given corresponding reference numerals. The control system 305, including the solenoids 82, 87 and the operator input device 206, are omitted from FIG. 12b for illustrative purposes.

Figure 13:
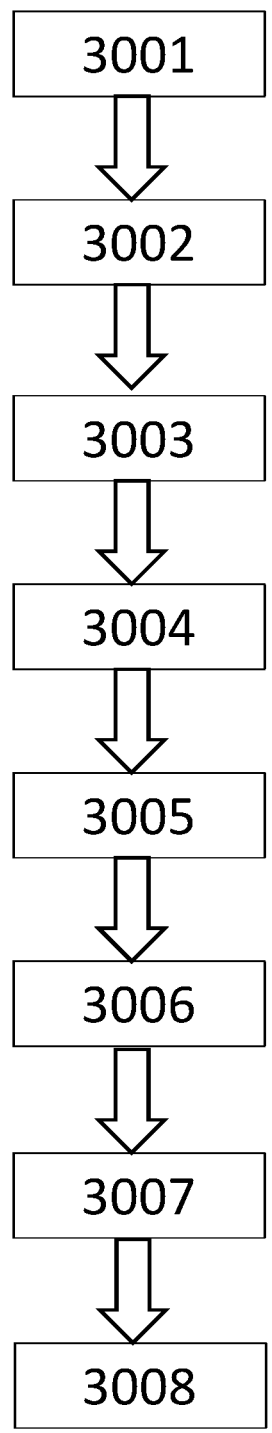
FIG. 13 is a flowchart of the sequence of steps of moving the wing tip device of the aircraft of FIGS. 12a and 12b from the ground configuration to the flight configuration and locking the wing tip device in the flight configuration.

The fourth embodiment differs from the first embodiment in that the control system 305 is configured to carry out the following 'stall-reverse-stall' method, which is shown in the flow chart of FIG. 13.

As with the first embodiment, in order to move the wing tip device from the ground configuration to the flight configuration, the locking pin 51 is retracted from the second locking bore 54 (step 3001) and the inner race is rotated clockwise (step 3002).

The alignment pin 61 is then actuated in the first direction D1 (step 3003).

When the geared rotary actuator 42 stalls for a first time (step 3004), this is detected by the control unit 200, which then reverses the direction of the geared rotary actuator 42, i.e. of the inner race 9 (step 3005). The inner race 9 is rotated in this reverse direction until the geared rotary actuator 42 stalls again (i.e. for a second time) (step 3006). This ensures that, whether the alignment pin 61 first comes into contact with the leading side 101 or the trailing side 102 of the alignment bore 62, the alignment pin 61 ends up in its end position.

In this regard, if the alignment pin 61 first contacts the second side 102 of the alignment bore 62 (i.e. the trailing side) then the alignment pin 61 will jam in the alignment bore 62 (see FIG. 12*a*). This prevents further rotation of the rotary actuator 42 in that direction, which provides the first stall of the rotary actuator 42 (step 3004).

As the inner race 9 is rotated in the reverse direction (i.e. to the left in FIG. 12*a*), the alignment pin 61 then slides along the second side 102, which has now become the 'leading side', to its end position in the alignment bore 62 (see FIG. 12*b*). When the alignment pin reaches its end position, this prevents rotation of the rotary actuator 42, which provides the second stall of the geared rotary actuator 42 (step 3006).

Alternatively, if the alignment pin 61 first contacts the first side 101 of the alignment bore 62 (i.e. the leading side) then the as the inner race continues to rotate in the clockwise direction, the alignment pin 61 slides along the first side 101 of the alignment bore 62, to its end position (as in FIGS. 7*c* and 7*d* for the first embodiment). Therefore the first stall that will occur will be when the alignment pin 61 is in its end position. The control unit 22 will then try and reverse the rotation of the geared rotary actuator 42, but this will stall immediately as the alignment pin 61 is in its end position, thereby causing the second stall.

Therefore, in both of these cases, the 'stall-reverse-stall' method acts to guide the alignment pin 61 into its end position in the alignment bore 62, which aligns the locking bore 53 with locking pin 51.

As in the previous embodiments, the locking pin 51 is then actuated into the locking bore 53 (step 3007) and the alignment pin 61 then withdrawn from the alignment bore 62 (step 3008).

This embodiment is advantageous in that it does not require the use of a sensor arrangement to detect whether the alignment pin 61 has jammed with a trailing side of the alignment bore 62.

However, this embodiment could incorporate such a sensor arrangement. For example, referring to FIGS. 14*a* and 14*b*, there is shown a fifth embodiment of the invention. This embodiment of the invention is identical to the fourth embodiment, except for the differences described below. Corresponding features are given corresponding reference numerals.

This embodiment differs from the fourth embodiment in that a jamming sensor, in the form of a magnetic sensor 203, is fixedly attached to the bore housing 50 and faces into the cylindrical bore 49 in which the alignment pin 61 is slidably mounted. A magnet 204 is fixedly attached to the alignment pin 61, so that it moves with the alignment pin 61 in the first direction D1.

The magnetic sensor 203, and magnet 204, form part of the control system 305. The magnetic sensor 203 is connected to the control unit 200, to provide an input signal to the control unit 200 (the control unit 200 is schematically shown twice in FIG. 14*a* for illustrative purposes, but it will be appreciated that there is only one control unit 200), and is arranged to sense the position of the magnet 204 in order to detect whether or not the alignment pin 61 has passed to its end position in the alignment bore 62. The control system 305, including the control unit 200, the solenoids 82, 87 and the operator input device 206, are omitted from FIG. 14*b* for illustrative purposes.

Reference will now be made to the flow-chart in FIG. 15, which shows a method of changing the configuration of the wing tip device of the fifth embodiment from the ground configuration to the flight configuration. In order to move the wing tip device from the ground configuration to the flight configuration, the locking pin 51 is retracted from the second locking bore 54 (step 4001) and the inner race is rotated clockwise (step 4002), as with the first embodiment.

The alignment pin 61 is then actuated in the first direction D1 (step 4003).

The control unit 200 is configured to then carry out the 'stall-reverse-stall' method of the fourth embodiment, i.e. following the stall of the geared rotary actuator 42 (see FIG. 14*a* and step 4004), the inner race 9 is rotated in the reverse direction (step 4005) until the geared rotary actuator 42 stalls again (step 4006). This should, in general, cause the alignment pin 61 to be moved to its end position (see FIG. 14*b*), thereby aligning the locking bore 53 and locking pin 51.

Figure 15:
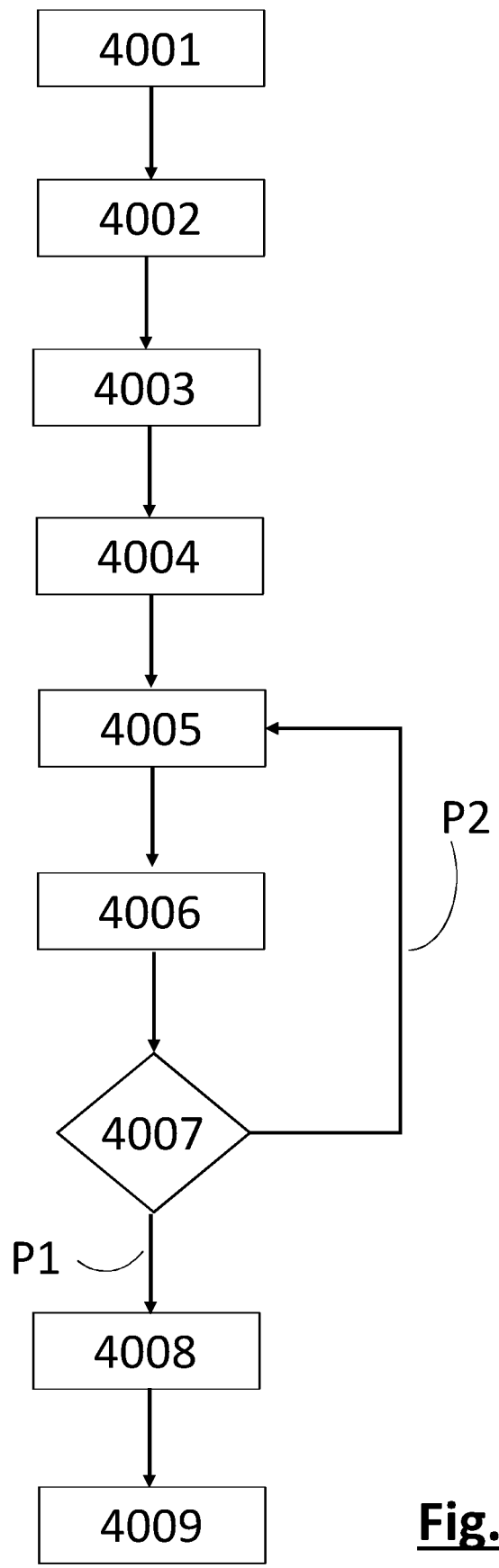
FIG. 15 is a flowchart of the sequence of steps of moving the wing tip device of the aircraft of FIGS. 14a and 14b from the ground configuration to the flight configuration and locking the wing tip device in the flight configuration.

If (in step 4007) the magnetic sensor 203 signals to the control unit 200 that the alignment pin 61 is in its end position then control unit 200 follows the method of path P1 in FIG. 15, in which it causes the locking pin 51 to be actuated into the locking bore 53 (step 4008) and then to withdraw the alignment pin 61 from the alignment bore 62 (step 4009), as in the fourth embodiment.

However, if the magnetic sensor 203 signals to the control unit 200 that the alignment pin 61 is not in its end position (which may be because the alignment pin 61 is now jamming on the opposite side to that in the first jam, because the reversing of the rotation of alignment bore happened too quickly) then the control unit 200 follows the method of path P2 in FIG. 15, in which the 'stall-reverse-stall' method is repeated (i.e. following the stall of the geared rotary actuator 42 the inner race 9 is rotated in a reverse direction (to the direction it was rotating in immediately before the stall) until the geared rotary actuator 42 stalls again) until the magnetic sensor 203 signals to the control unit 200 that the alignment pin 61 is in its end position, following which path P1 is followed as above, to lock the wing tip device in the flight configuration.

In a further embodiment, the control unit 200 is configured to only repeat the stall-reverse-stall method once (i.e. to only carry out the stall-reverse-stall method twice), so as to avoid a failure of the magnetic sensor 203 carrying out an endless cycle of the stall-reverse-stall method.

Figure 16A:
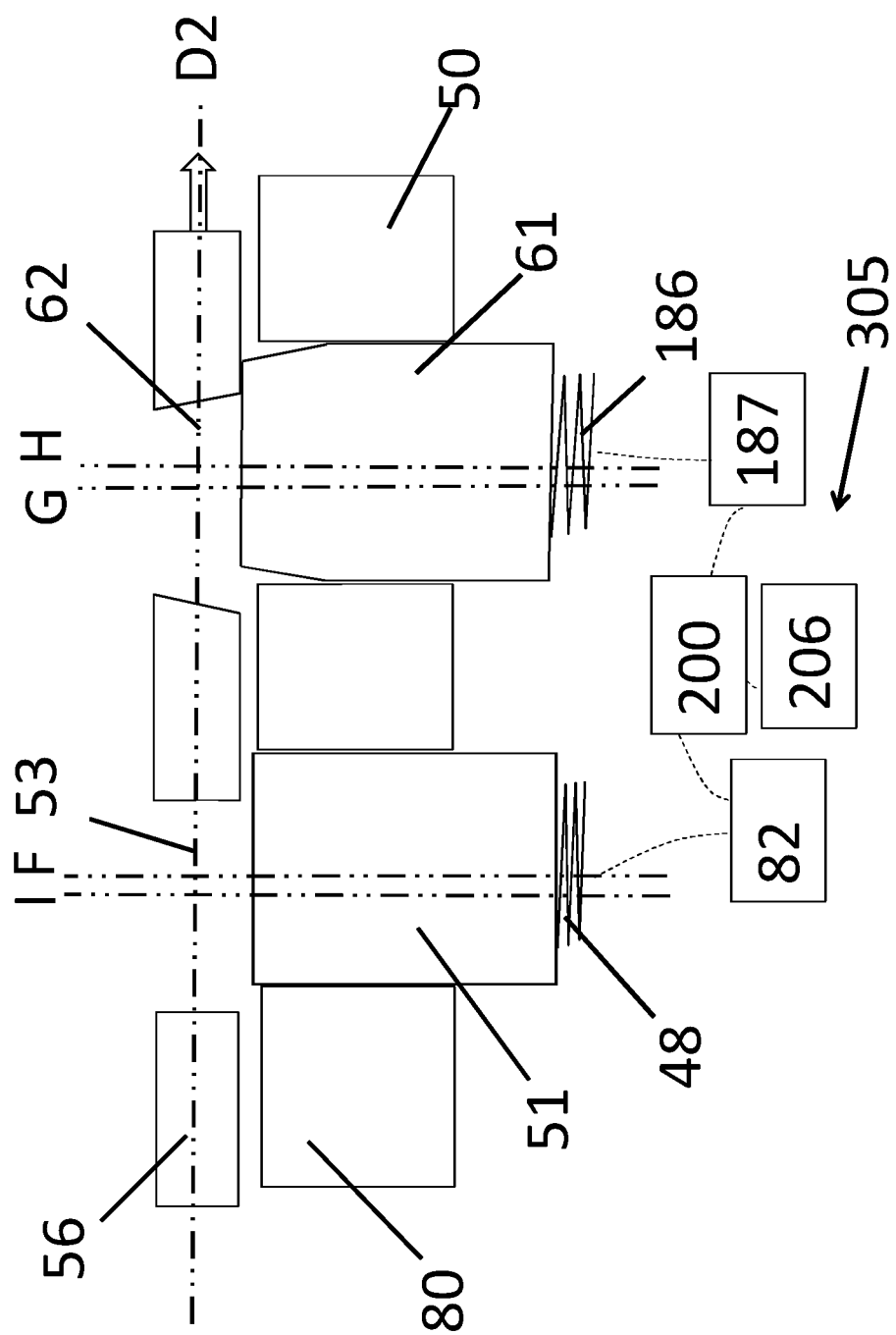

Referring to FIGS. 16*a* to 16*c*, there is shown a sixth embodiment of the invention. This embodiment of the invention is identical to the first embodiment of the invention, except for the differences described below. Corresponding features are given corresponding reference numerals.

This embodiment differs from the first embodiment in that a biasing spring 186 acts to bias the alignment pin 61 into its end position. In this regard, when the alignment pin 61 is in its initial position, the spring 186 is compressed and urges the alignment pin 61 forwards along the first direction D1.

When the first alignment bore 62 is misaligned with the alignment pin 61, in a position in which the leading side (in this case the first side 101) of the alignment bore 62, at its first end 65, is in an under travel position relative to the corresponding side (in this case the first side 107) of the alignment pin 61 at the first end 67 of the alignment pin 61, the first end 67 of the alignment pin 61 abuts against the lower surface of the arcuate flange 56. One or more of these abutting surfaces may be provided with a protective layer, to prevent abrasion due to friction between the abutting surfaces. For example, the first end 67 of the alignment pin 61 may be provided with a protective cap (not shown).

When the leading side 101 of the alignment bore 62, at its first end 65, passes the first side 107 of the alignment pin 61, at its first end 67, the biasing of the alignment pin 61, by the spring 186, moves the alignment pin 61 in the first direction D1, into the alignment bore 62. This causes the alignment pin 61 to engage with the leading side 101 of the alignment bore. As the alignment bore 62 continues to rotate in the same direction (in this case clockwise, i.e. to the right in FIG. 16*a*), the alignment pin 61 slides along the leading side 101 to its end position, thereby aligning the locking bore 53 with the locking pin 51, as in the first embodiment (see FIGS. 16*b* and 16*c*).

In this embodiment the biasing spring 186 also forms part of the control system 305. It will be appreciated that the spring 186 automatically provides engagement of the alignment pin with the leading side of the alignment bore and removes the need to provide a sensor arrangement to detect and trigger the movement of the alignment pin 67.

As with the first embodiment, when the locking bore 53 is aligned with the locking pin 51, the solenoid 82 is de-energised so that the spring 48 moves the locking pin 51 to its extended position in the locking bore 53.

A solenoid 187 is then used to withdraw the alignment pin 61 back to its initial position (as in the first embodiment). However once the alignment pin 61 has been withdrawn to its initial position, and when the alignment bore 62 is misaligned with the alignment pin 61, the solenoid 187 is de-energised so that biasing spring 186 biases the alignment pin 61 forwards along the first direction D1 (to provide the biasing function described above).

In the above described embodiments, the alignment pin actuator (86, 87; 186, 187) is configured to actuate the forward movement of the alignment pin 61 along the first direction D1 with a force that is small enough that it does not drive movement of the first alignment bore 62 along the second direction D2 (through contact of the alignment pin 61 with the alignment bore 62), i.e. it does not drive the locking pin 51 and locking bore 53 into alignment. The geared rotary actuator 42 instead drives the alignment bore 62 along the second direction D2, to allow the actuation of the alignment pin 61 in the first direction D1, to its end position, in which the alignment bore 62 is positioned in the second direction D2 such that the locking bore 53 is aligned with the locking pin 51. This 'passive engagement' may advantageously prevent high contact pressures being generated on the contacting surfaces of the alignment bore 62 and alignment pin 61.

Alternatively, or additionally, the alignment pin actuator (86, 87; 186, 187) may be configured to actuate the forward movement of the alignment pin 61 along the first direction D1 with a force that is large enough that the contact of the alignment pin with the (sides of the) alignment bore 62 drives movement of the alignment bore 62 along the second direction D2, to guide the locking bore 53 into alignment with the locking pin 51. This may be regarded as 'active engagement'.

The above described methods and apparatus relate to the first locking bore 53 and the first alignment bore 62, to moving the wing tip device 4 from the ground configuration 4*b* to the flight configuration 4*a* and to locking the wing tip device in the flight configuration 4*a*.

However, as stated above, the second locking bore 54 and the second alignment bore 63 have corresponding identical features to the first locking bore 53 and first alignment bore 62 respectively. It will be appreciated that the alignment pin 61 and second alignment bore 63 are used in a corresponding way to guide the second locking bore 54 into alignment with the locking pin 51, in order to lock the wing tip device in the ground configuration. Furthermore, in relation to each embodiment, a corresponding method is used to move the wing tip device 4 from the flight configuration 4*a* to the ground configuration 4*b* and to lock the wing tip device in the ground configuration 4*b*.

The alignment mechanism is advantageous in that it may allow for the locking pin 51 to be accurately aligned with a locking bore 53, 54, before it is actuated into the locking bore, despite any tolerances and/or elasticity in the aircraft 1, particularly in the rotational joint 10. This may allow the locking pin 51 to form a close-fit with a locking bore, which reduces concentrated loading on the locking pin 51 and reduces backlash in the rotational joint under loading.

Furthermore, the alignment mechanism provides this guiding function separately to the locking pin 51 and locking bores 53, 54 and so the locking pin 51 and locking bores do not need to themselves comprise any alignment features, for example by tapering the locking pin and/or locking bore. This avoids large stresses being exerted on the locking pin 51, during use. In addition, it avoids radial loads on the locking pin 51 (in the second direction) being transmitted into axial loads (in the first direction). This therefore allows the locking mechanism, and rotational joint as a whole, to be simpler, lighter and smaller. This is particularly advantageous with aircraft.

The alignment pin 61, and alignment bores 62, 63, of any of the above embodiments, may be used when unlocking the wing tip device from the flight or ground configuration respectively, to minimise or remove shear loading on the locking pin 51 before it is removed from the respective locking bore 53, 54.

In this regard, with reference to FIGS. 17*a* and 17*b*, in order to unlock the wing tip device 4 from the flight configuration, whilst the locking pin 51 is located in the first locking bore 53 (to lock the wing tip device in the flight configuration), the alignment pin 61 is inserted into the first alignment bore 62 and moved to its end position in the bore 62 (see FIG. 17*a*).

When the alignment pin 61 is in its end position, the aligning action of the alignment pin 61 causes there to be minimal, or substantially no, shear force exerted on the locking pin 51 by the locking bore 53. Whilst the alignment pin 61 is in its end position in the alignment bore, the locking pin 51 is removed from the locking bore 53 (see FIG. 17*b*). This allows the locking pin 51 to be removed cleanly from the locking bore 53.

It will be appreciated that, in a corresponding way, in order to unlock the wing tip device from the ground configuration the alignment pin 61 is inserted into the second alignment bore 63 to allow the locking pin 51 to be removed cleanly from the second locking bore 54.

Whilst the present invention has been described and illustrated with reference to particular embodiments, it will be appreciated by those of ordinary skill in the art that the invention lends itself to many different variations not specifically illustrated herein.

For example, in the currently described embodiments both the alignment pin 61 and alignment bores 62, 63 are tapered. Alternatively only the alignment pin or the alignment bores may be tapered such that engagement of the alignment pin in the alignment bores acts to guide the locking pin and the respective locking bore into alignment.

Also, the tapered alignment pin or alignment bore may not be axisymmetric. For example, only one of its sides may be inclined relative to the longitudinal axis of the pin or bore.

For example, referring to FIGS. 18a to 18b there is shown an enlarged cross-sectional view of an alignment pin and bore according to a further embodiment of the invention. This embodiment is identical to the first embodiment except for the following differences. Corresponding features are given corresponding reference numerals. In this embodiment the alignment pin 61 is tapered but the alignment bore 62 is not. In this regard, the alignment bore 62 is cylindrical. Furthermore, in this embodiment, the alignment pin 61 is not axisymmetric. In this regard, a first half 401 of the alignment pin 51 has the shape of half a side of a truncated cone, which provides the first surface 107, and a second half 402 is semi-cylindrical, which provides the second surface 108 of the pin 61.

As the alignment bore 62 rotates clockwise (i.e. to the right in FIG. 18a), the alignment pin 61 is moved in the first direction, with the first inclined surface 107 of the pin 61 sliding against the lower corner 403 of the internal surface of the arcuate flange 56 that defines the bore 62. As with the previous embodiments, as the alignment pin slides to its end position in the alignment bore 62 (see FIG. 18b), this guides the locking bore 53 into alignment with the locking pin 51.

Although the arrangement in FIGS. 18a and 18b may be used, the preceding embodiments are preferable since they result in lower contacting stress being exerted on the alignment pin and alignment bore.

It will be appreciated that the alignment pin and alignment bores may have different shapes to that of the described embodiments. Similarly, the locking pin and locking bores may have different shapes to that of the described embodiments.

In relation to the alignment 'pin' and locking 'pin', it will be appreciated that a 'pin' is any member that may be received in a bore. It does not have to be elongate (i.e. it could have a width equal to its length) and it could have any cross-sectional shape (i.e. it does not have to have a circular cross-sectional shape). Its cross-sectional shape may vary across its length. It does not have to be solid, for example it could be hollow.

The alignment pin and/or alignment bore may, instead of being frusto-conical, have the shape of a complete (i.e. non-truncated) cone. However, a frusto-conical shape is preferred as it provides lower stress concentrations.

Any of the control systems of any of the above embodiments may be formed by any arrangement that provides the function of the control system. This may be an arrangement whereby a computer controls one or more actuators. In this case, the computer may be programmed with software. Alternatively the computer may be formed by hardware that is hardwired to provide the function of the control system without any programmable software, for example. The control system may not comprise a computer, for example in a mechanical, electro-mechanical, hydraulic or pneumatic control system, or any combinations of these that is configured to provide the function of the control system. For example the alignment pin actuator and locking pin actuator could be mechanical actuators (e.g. levers, cranks, etc.) that are coupled to the wing tip device actuator (or to the inner race) such that they actuate the alignment pin in the first direction and actuate the locking pin in the locking direction, at the appropriate times in accordance with the respective embodiment. The control system may be open loop (i.e. has no feedback) or closed loop (has feedback—for example in relation to the position of the wing tip device, the alignment pin or bore, the locking pin or bore, etc.)

In the currently described embodiments the alignment pin actuator (86, 87) is formed by a solenoid 87 and spring 86, or by a biasing spring 186 and solenoid 187. The alignment pin actuator may be any type of actuator suitable for moving the alignment pin into engagement with the alignment bore. For example, the alignment pin actuator could be or comprise a mechanical actuator, an electro-mechanical actuator (for example an electric motor connected to a gearing arrangement arranged to convert rotary motion to reciprocal linear motion), a pneumatic or hydraulic actuator (e.g. a pneumatic or hydraulic piston), for example.

Similarly, in the currently described embodiments the locking pin actuator (48, 82) is formed by a solenoid 82 and spring 48. The locking pin actuator may be any type of actuator suitable for moving the locking pin into the locking bore. For example, the locking pin actuator could be or comprise a mechanical actuator, an electro-mechanical actuator (for example an electric motor connected to a gearing arrangement arranged to convert rotary motion to reciprocal linear motion), a pneumatic or hydraulic actuator (e.g. a pneumatic or hydraulic piston), for example.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft including a wing, the wing comprising a fixed wing and a wing tip device at the tip of the fixed wing, the wing tip device being rotatable relative to the fixed wing between:
    a flight configuration for use during flight, and
    a ground configuration for use during ground-based operations, in which ground configuration the wing tip device is rotated relative to the fixed wing such that the span of the wing is reduced,
    the wing further including a rotational joint comprising:
    a rotation mechanism that rotatably couples the wing tip device to the fixed wing, to allow the wing tip device to rotate relative to the fixed wing between the flight and ground configurations, and
    a locking mechanism comprising a locking bore and a locking pin that is receivable in the locking bore to lock the wing tip device in one of the flight or ground configurations,
    wherein the rotational joint further comprises an alignment mechanism comprising an alignment pin and an alignment bore and at least one of the alignment pin and alignment bore is tapered such that engagement of the alignment pin in the alignment bore acts to guide the locking bore and locking pin into alignment.

2. The aircraft according to claim 1 wherein the alignment pin is arranged to first engage a leading side of the alignment bore.

3. The aircraft according to claim 2 wherein the aircraft comprises a control system arranged to detect when the alignment bore is positioned relative to the alignment pin such that the alignment pin will first engage a leading side of the alignment bore and to engage the alignment pin in the alignment bore when said position of the alignment bore is detected.

4. The aircraft according to claim 1, wherein the aircraft is arranged such that after the alignment pin contacts a leading side of the alignment bore, the alignment bore rotates in a direction the same as a direction the alignment bore was moving immediately prior to contacting the alignment pin.

5. The aircraft according to claim 1, wherein the aircraft comprises a control system arranged such that when the wing tip device is rotated to the one of the flight or ground configurations, the control system effects the following steps:
  (i) the alignment bore is positioned in an over-travel position relative to the alignment pin;
  (ii) the alignment pin is then engaged in the alignment bore, with the alignment bore in the over-travel position; and
  (iii) the alignment bore is then rotated relative to the alignment pin in a reverse direction, relative to when the wing tip device was rotated to the one of the flight or ground configurations.

6. The aircraft according to claim 5 wherein the control system comprises a mechanical stop arranged to position the alignment bore, relative to the alignment pin, in the over-travel position.

7. The aircraft according to claim 1, wherein the aircraft comprises a control system arranged such that if the alignment pin is prevented from reaching an end position in the alignment bore, in which the locking bore and locking pin are aligned, then the alignment bore is rotated relative to the alignment pin in a reverse direction.

8. The aircraft according to claim 1, wherein an alignment pin actuator is arranged to actuate the engagement of the alignment pin in the alignment bore and wherein the alignment pin actuator is configured to actuate the engagement with a force that is small enough that it does not drive the locking pin and locking bore into alignment.

9. The aircraft according to claim 1, wherein the locking mechanism is configured to lock the rotation mechanism so as to lock the wing tip device in the one of the flight or ground configurations.

10. The aircraft according to claim 1, wherein the rotation mechanism comprises a follower and guide, the follower being rotationally fixed relative to the wing tip device and the guide being rotationally fixed relative to the fixed wing such that as the wing tip device rotates, the follower is rotated relative to the guide.

11. An aircraft wing configured for use on an aircraft, the aircraft wing comprising a fixed wing and a wing tip device at the tip of the fixed wing, the wing tip device being rotatable relative to the fixed wing between:
  a flight configuration for use during flight, and
  a ground configuration for use during ground-based operations, in which ground configuration the wing tip device is rotated relative to the fixed wing such that the span of the wing is reduced,
  the aircraft wing including a rotational joint comprising:
  a rotation mechanism that rotatably couples the wing tip device to the fixed wing, to allow the wing tip device to rotate relative to the fixed wing between the flight and ground configurations,
  and a locking mechanism comprising a locking bore and a locking pin that is receivable in the locking bore to lock the wing tip device in one of the flight or ground configurations,
  wherein the rotational joint further comprises an alignment mechanism comprising an alignment pin and an alignment bore and at least one of the alignment pin and alignment bore is tapered such that engagement of the alignment pin in the alignment bore acts to guide the locking bore and locking pin into alignment.

12. A rotational joint configured for use on an aircraft, the rotational joint comprising:
  a rotation mechanism for rotatably coupling a wing tip device to a fixed wing to allow the wing tip device to rotate relative to the fixed wing between
  a flight configuration for use during flight, and
  a ground configuration for use during ground-based operations, in which ground configuration the wing tip device is rotated relative to the fixed wing such that the span of the wing is reduced
  a locking mechanism comprising a locking bore and a locking pin that is receivable in the locking bore to lock the wing tip device in one of the flight or ground configurations, and
  an alignment mechanism comprising an alignment pin and an alignment bore and at least one of the alignment pin and alignment bore is tapered such that engagement of the alignment pin in the alignment bore acts to guide the locking bore and locking pin into alignment.

13. A method of locking a wing tip device of an aircraft in a flight or ground configuration, the aircraft comprising a wing, the wing comprising a fixed wing and a wing tip device at the tip of the fixed wing, the wing tip device being rotatable relative to the fixed wing between:
  a flight configuration for use during flight, and
  a ground configuration for use during ground-based operations, in which ground configuration the wing tip device is rotated relative to the fixed wing such that the span of the wing is reduced,
  the aircraft wing including a rotational joint comprising:
  a rotation mechanism that rotatably couples the wing tip device to the fixed wing, to allow the wing tip device to rotate relative to the fixed wing between the flight and ground configurations, and
  a locking mechanism comprising a locking bore and a locking pin that is receivable in the locking bore to lock the wing tip device in one of the flight or ground configurations,
  wherein the rotational joint further comprises an alignment mechanism comprising an alignment pin and an alignment bore and at least one of the alignment pin and alignment bore is tapered, and
  wherein the method comprises:
  firstly engaging the alignment pin in the alignment bore to guide the locking bore and locking pin into alignment, and
  subsequently receiving the locking pin in the locking bore to lock the wing tip device in the one of the flight or ground configurations.

14. The method according to claim 13 wherein the alignment pin first engages a leading side of the alignment bore.

15. The method according to claim 14 wherein the method further comprises detecting when the alignment bore is positioned relative to the alignment pin such that the alignment pin will first engage a leading side of the alignment bore and actuating the alignment pin to engage the leading side of the alignment bore when said position of the alignment bore is detected.

16. The method according to claim 14, wherein after the alignment pin contacts a leading side of the alignment bore, the alignment bore rotates in the same direction as it was moving immediately prior to its contact with the alignment pin.

17. The method according to claim 13, wherein when the wing tip device is rotated to the one of the flight or ground configurations:
   (i) the alignment bore is positioned in an over-travel position relative to the alignment pin;
   (ii) the alignment pin is then engaged in the alignment bore, with the alignment bore in the over-travel position;
   (iii) the alignment bore is then rotated relative to the alignment pin in a reverse direction, relative to when the wing tip was rotated to the one of the flight or ground configurations.

18. The method according to claim 17 wherein a mechanical stop is used to position the alignment bore, relative to the alignment pin, in the over-travel position.

19. The method according to claim 13, wherein if the alignment pin is prevented from reaching an end position in the alignment bore, in which the locking bore and locking pin are aligned, then the alignment bore is rotated relative to the alignment pin in a reverse direction.

20. A method of unlocking a wing tip device of an aircraft from a flight or ground configuration, the aircraft comprising a wing, the wing comprising a fixed wing and a wing tip device at the tip of the fixed wing, the wing tip device being rotatable relative to the fixed wing between:
   a flight configuration for use during flight, and
   a ground configuration for use during ground-based operations, in which ground configuration the wing tip device is rotated relative to the fixed wing such that the span of the wing is reduced,
the aircraft wing comprising a rotational joint comprising:
   a rotation mechanism that rotatably couples the wing tip device to the fixed wing, to allow the wing tip device to rotate relative to the fixed wing between the flight and ground configurations, and
   a locking mechanism comprising a locking bore and a locking pin that is receivable in the locking bore to lock the wing tip device in one of the flight or ground configurations,
   wherein the rotational joint further comprises an alignment mechanism comprising an alignment pin and an alignment bore and at least one of the alignment pin and alignment bore is tapered, and
   wherein the method comprises removing the locking pin from the locking bore, to unlock the wing tip device from the one of the flight or ground configurations, whilst the alignment pin is engaged in the alignment bore.

* * * * *